US007231490B2

(12) United States Patent
Kanai

(10) Patent No.: US 7,231,490 B2
(45) Date of Patent: Jun. 12, 2007

(54) STORAGE DEVICE CONTROL APPARATUS AND CONTROL METHOD FOR THE STORAGE DEVICE CONTROL APPARATUS

(75) Inventor: Hiroki Kanai, Odawara (JP)

(73) Assignee: Hitachi, Ltd., Tokyo (JP)

( * ) Notice: Subject to any disclaimer, the term of this patent is extended or adjusted under 35 U.S.C. 154(b) by 510 days.

(21) Appl. No.: 10/654,996

(22) Filed: Sep. 5, 2003

(65) Prior Publication Data

US 2004/0210713 A1 Oct. 21, 2004

(30) Foreign Application Priority Data

Apr. 16, 2003 (JP) ............................ 2003-111405

(51) Int. Cl.
*G06F 13/00* (2006.01)

(52) U.S. Cl. ....................... 711/112; 711/114; 711/147; 711/154; 711/156

(58) Field of Classification Search ................ 711/112, 711/114, 147, 154, 156
See application file for complete search history.

(56) References Cited

U.S. PATENT DOCUMENTS

| | | | | |
|---|---|---|---|---|
| 6,629,204 | B2 | 9/2003 | Tanaka et al. | 711/110 |
| 6,651,154 | B1 | 11/2003 | Burton et al. | 711/202 |
| 6,763,398 | B2 | 7/2004 | Brant et al. | 710/8 |
| 6,961,788 | B2 | 11/2005 | Kanai et al. | 710/36 |
| 6,985,989 | B2 | 1/2006 | Fujimoto et al. | 710/305 |
| 7,020,731 | B2 | 3/2006 | Fujimoto et al. | 710/305 |
| 7,047,329 | B2 * | 5/2006 | Nakayama et al. | 710/36 |
| 7,130,961 | B2 | 10/2006 | Kanai et al. | 711/113 |
| 2001/0047462 | A1 | 11/2001 | Dimitroff et al. | 711/162 |
| 2003/0224824 | A1 | 12/2003 | Hanson | 455/560 |
| 2004/0158656 | A1 | 8/2004 | Fujibayashi et al. | 710/38 |
| 2005/0050268 | A1 * | 3/2005 | Yoshida | 711/114 |

FOREIGN PATENT DOCUMENTS

| | | |
|---|---|---|
| JP | 2000-099281 | 4/2000 |
| JP | 2000-267815 | 9/2000 |
| JP | 2001-256003 | 9/2001 |
| JP | 2002-123479 | 4/2002 |
| JP | 2002-333956 | 11/2002 |
| JP | 2003-241905 | 8/2003 |
| JP | 2003-263279 | 9/2003 |
| JP | 2003-323261 | 11/2003 |

* cited by examiner

*Primary Examiner*—Reba I. Elmore
(74) *Attorney, Agent, or Firm*—Mattingly, Stanger, Malur & Brundidge, P.C.

(57) ABSTRACT

A storage device control apparatus includes a mounting part and an internal connection part. The mounting part can removably mount channel control unit, each with a host interface controller formed therein for receiving data I/O requests, disk control units, each with a disk interface controller formed therein for performing I/O control of the data to storage volumes storing data in response to the data I/O requests, cache memory units, each with a memory formed therein for storing the data, and storage control units, each with the host interface controller, the disk interface controller, and the memory formed therein. The internal connection part connects the channel control units, the disk control units, the cache memory units, and the storage control units in a communicable manner.

22 Claims, 36 Drawing Sheets

INITIAL CONTROLLER
(MODULAR CONTROLLER)

| HEADER PART | | | | PAYLOAD PART |
|---|---|---|---|---|
| DESTINATION ADDRESS | SOURCE ADDRESS | TRANSFER LENGTH | PACKET TYPE | |

FIG. 38

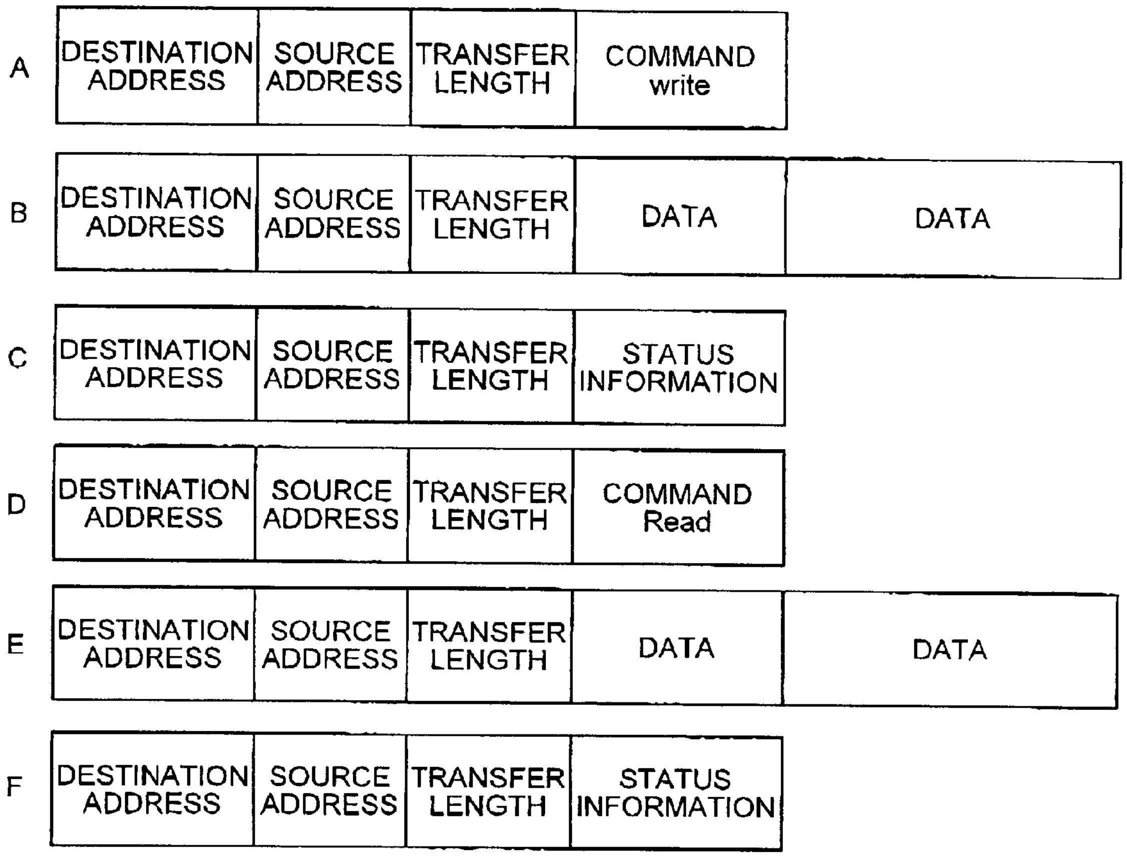

FIG. 39

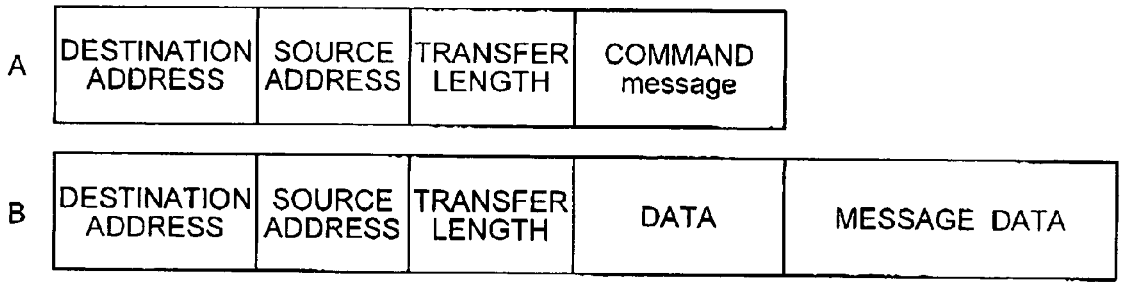

| | DESTINATION ADDRESS | SOURCE ADDRESS | TRANSFER LENGTH | COMMAND write | |
|---|---|---|---|---|---|
| A | | | | | |

| | DESTINATION ADDRESS | SOURCE ADDRESS | TRANSFER LENGTH | DATA | DATA |
|---|---|---|---|---|---|
| B | | | | | |

| | DESTINATION ADDRESS | SOURCE ADDRESS | TRANSFER LENGTH | STATUS INFORMATION | |
|---|---|---|---|---|---|
| C | | | | | |

| | DESTINATION ADDRESS | SOURCE ADDRESS | TRANSFER LENGTH | COMMAND Read | |
|---|---|---|---|---|---|
| D | | | | | |

| | DESTINATION ADDRESS | SOURCE ADDRESS | TRANSFER LENGTH | DATA | DATA |
|---|---|---|---|---|---|
| E | | | | | |

| | DESTINATION ADDRESS | SOURCE ADDRESS | TRANSFER LENGTH | STATUS INFORMATION | |
|---|---|---|---|---|---|
| F | | | | | |

| | DESTINATION ADDRESS | SOURCE ADDRESS | TRANSFER LENGTH | COMMAND message | |
|---|---|---|---|---|---|
| A | | | | | |

| | DESTINATION ADDRESS | SOURCE ADDRESS | TRANSFER LENGTH | DATA | MESSAGE DATA |
|---|---|---|---|---|---|
| B | | | | | |

STORAGE DEVICE CONTROL APPARATUS AND CONTROL METHOD FOR THE STORAGE DEVICE CONTROL APPARATUS

CROSS-REFERENCE TO RELATED APPLICATION

This application is based on JP-A-2003-111405 which is incorporated by reference herein.

FIELD OF THE INVENTION

The present invention relates to a storage device control apparatus and a control method for the storage device control apparatus.

BACKGROUND OF THE INVENTION

A variety of storage systems used as data storage apparatuses in computer systems have been proposed. The storage systems range from small to large systems.

The storage system for a small computer system is provided as an apparatus with a minimum of features as a storage system, aiming at facilitating the introduction and reducing the cost at the time of initial introduction.

On the other hand, the storage system for a large computer system is adopting a different architecture from that for the small computer system. The large storage system is designed to have high expandability so it can respond to the needs of users who want to operate the largest system.

However, when the storage capacity needs increasing or the storage system needs scaling up due to integration with another storage system, the storage system for a small computer system may have to be replaced by a large storage system, or add another storage system.

In addition, the storage system for a large computer system, which has been designed from the outset to have high expandability, would place enormous cost pressures from the initial phase of introduction.

SUMMARY OF THE INVENTION

The present invention has been made in view of the above problems, and it is an object thereof to provide a storage device control apparatus and a control method for the storage device control apparatus.

In order to solve the above problems, a storage device control apparatus according to the present invention includes a mounting part and an internal connection part. The mounting part is capable of removably mounting channel control units, each with a host interface controller formed therein for receiving data I/O requests; disk control units, each with a disk interface controller formed therein for performing I/O control of the data to storage volumes storing data in response to the data I/O requests; cache memory units, each with a memory formed therein for storing the data; and storage control units, each with the host interface controller, the disk interface controller, and the memory formed therein. The internal connection part connects the channel control units, the disk control units, the cache memory units, and the storage control units in a communicable manner.

In the storage device control apparatus according to the present invention, all or any of the storage control units, the channel control units, the disk control units, and the global caches can be mounted, thereby configuring a flexible storage system according to the needs of customers.

The data I/O requests include data read requests and data write requests, for example. The I/O control means control for reading or writing data. The storage volumes are storage resources including physical volumes as physical storage areas provided by a storage device, such as a hard disk drive or semiconductor storage device, and logical volumes as storage areas logically set on the physical volumes.

Other problems and methods for solving the problems disclosed by the application will be more apparent from the description of the embodiment in conjunction with the accompanying drawings.

According to the present invention, there are provided a storage device control apparatus and a control method for the storage device control apparatus, which enable easy introduction at any size and cost according to the needs of users.

BRIEF DESCRIPTION OF THE DRAWINGS

A Preferred embodiment of the present invention will now be described in conjunction with the accompanying drawings, in which:

FIG. 38 shows the structure of another command according to the embodiment;

FIG. 39 shows the structure of a message according to the embodiment;

DETAILED DESCRIPTION OF THE EMBODIMENTS

An embodiment will now be described in detail with reference to the accompanying drawings.

<<External Appearance>>

Figure 1:
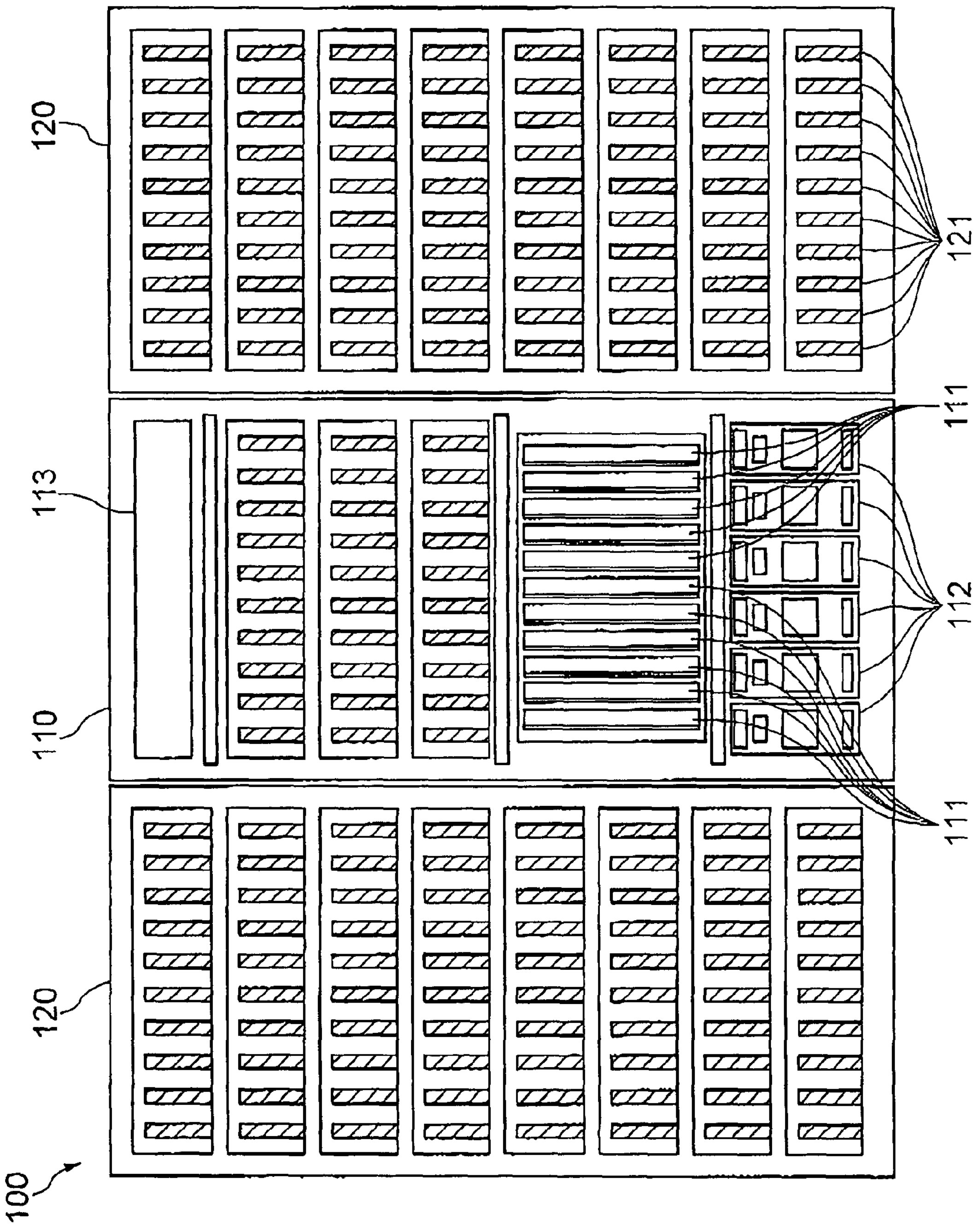
FIG. 1 shows the external appearance of a storage system according to the embodiment.

FIG. 1 shows the external appearance of a storage system 100 according to an embodiment of the present invention.

The storage system 100 includes a disk control device (storage device control apparatus) 110 and disk driving devices 120. The disk control device 110 controls the entire storage system 100. The disk driving devices 120 accommodate a large number of disk drives 121 for storing data. In the storage system 100 shown in FIG. 1, the disk control device 110 is placed in the center and the disk driving devices 120 are arranged on opposite sides of the disk control device 110. As shown in FIG. 1, the disk drives 121 can also be accommodated in the disk control device 110.

The disk control device 110 includes a controller 111, a fan 113, and a power source 112. The controller 111 controls the entire storage system 100. As will be described later, the controller 111 includes channel control units 300, disk control units 400, storage control units 800, and global cache units (cache memory units) 600. Mounting these units into the disk control device 110 enables the disk control device 110 to control the storage system 100. As will be described later, each of these units is implemented as an integral unit of hardware elements formed on a circuit board, software executed on the hardware unit, or both. The fan 113 provides cooling for the disk control device 110. The power source 112 supplies power to the disk control device 110.

The large number of disk drives 121 are mounted in the driving device 120. The disk drives 121 are removably mounted in a cabinet of the disk driving device 120.

Although not shown in FIG. 1, a management terminal 160 is connected to the disk control device 110. The management terminal 160 is a computer for maintenance of the storage system 100. The management terminal 160 may be incorporated in the storage system 100, or locally placed and connected to the storage system through a network.

<<General Structure>>

Figure 2:
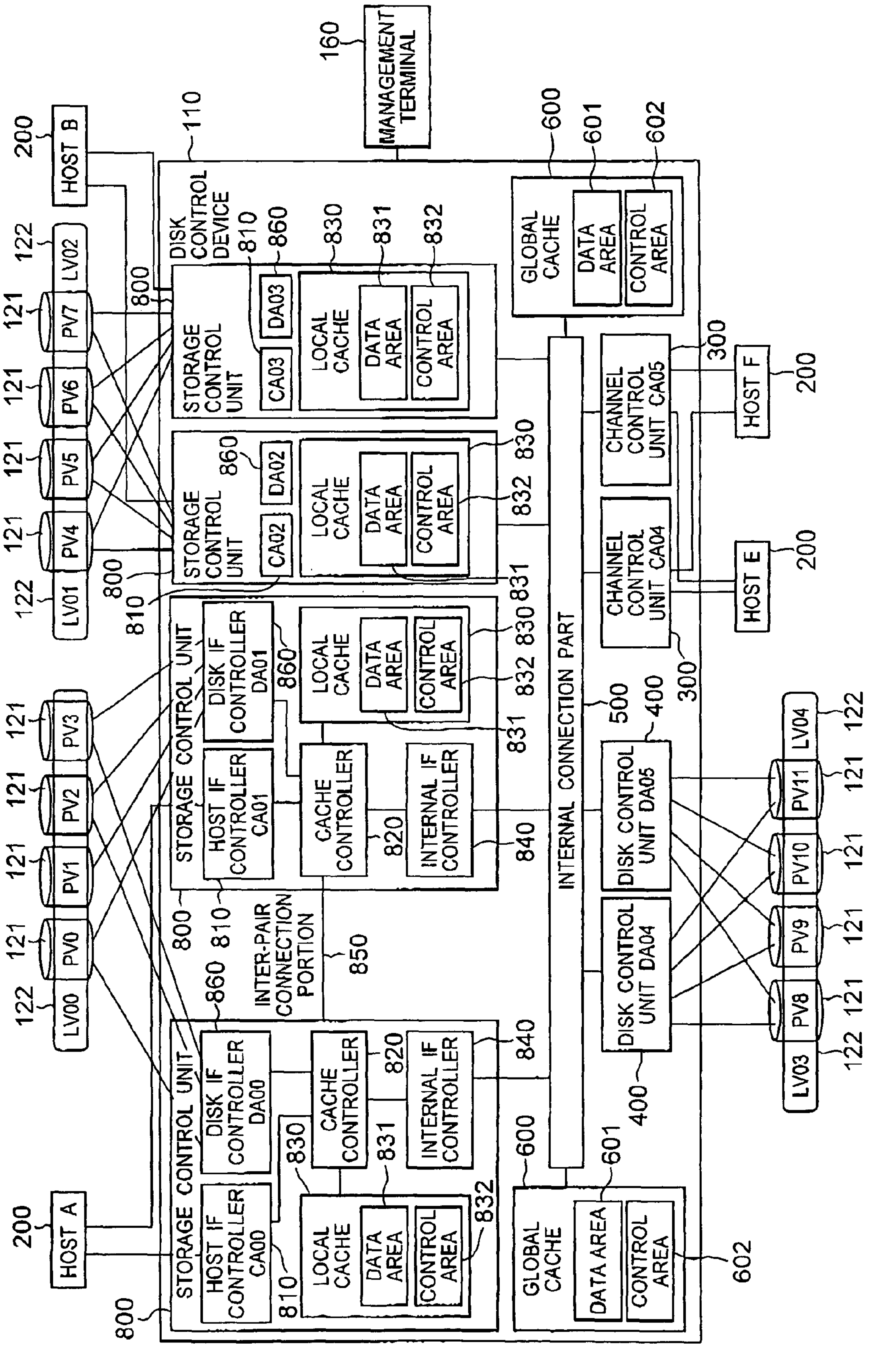
FIG. 2 is a block diagram showing the general structure of the storage system according to the embodiment.

FIG. 2 is a block diagram showing the general structure of the storage system according to the embodiment.

The disk control device 110 is connected with host computers (information processing apparatuses) 200 to receive data read/write requests (data I/O requests) from the host computers 200. It is also connected with the large number of disk drives 121 to control data I/O to and from storage volumes in response to the data I/O requests from the host computers 200. The storage volumes are storage resources including physical volumes as storage areas provided by the storage devices and logical volumes as storage areas logically set on the physical volumes. A variety of storage devices may be employed such as hard disk drives or semiconductor memory devices.

Communication between the disk control device 110 and host computers 200 can be carried out according to various communication protocols, for example, Fiber Channel, SCSI (Small Computer System Interface), FICON (Fibre Connection) (registered trademark), ESCON (Enterprise System Connection) (registered trademark), ACONARC (Advanced Connection Architecture) (registered trademark), FIBARC (Fibre Connection Architecutre) (registered trademark), and TCP/IP (Transmission Control Protocol/Internet Protocol). These communication protocols may co-exist in the system. For example, the disk control device 110 may communicate with Host A 200 via Fiber Channel and Host B 200 via TCP/IP. When the host computer 200 is a main frame computer, FICON, ESCON, ACONARC, or FIBRARC may be used, while it is an open system computer, Fiber Channel, SCSI, or TCP/IP may be used. The data read/write requests from the host computers 200 may be made by the block, as a unit of data management in a storage volume, or by the file by specifying the name of a file. In the latter case, the disk control device 110 functions as a NAS (Network Attached Storage) that enables file-level access from the host computers 200.

Each of the host computers 200 is a computer provided with a CPU (Central Processing Unit), a memory, an I/O device, etc. Client computers, not shown, are connected to each host computer 200. The host computer 200 provides various information processing services to the client computers. The information processing services provided by the host computer 200 may include not only on-line services such as automatic deposit and payment service at a bank and home page viewing service, but also batch processing service for experimental simulation in science and technology. Further, access between the disk control device 110 and each host computer 200 is double-routed so that even when a failure occurs in one access route, I/O requests can continue to be received through the other access route.

The disk control device 110 shown in FIG. 2 has four storage control units 800, two channel control units 300, two disk control units 400, two global caches 600, and an internal connection unit 500. Further, the management terminal 160 is connected to the disk control device 110.

<<Storage Control Unit>>

Each storage control unit 800 includes a host interface controller (host IF controller) 810, a disk interface controller (disk IF controller) 860, a cache controller 820, a local cache (memory) 830, and an internal interface controller (internal IF controller) 840. The storage control unit 800 is implemented as an integral unit of hardware elements formed on a circuit board, software executed on the hardware unit, or both.

The host IF controller 810 has an interface function with a host computer 200. The disk IF controller 860 has an interface function for I/O control to the storage volumes. The local cache 830 stores data exchanged between the host computer 200 and the storage volumes. The cache controller 820 controls the local cache 830. In the embodiment, the storage control units 800 form clusters so that even when a failure occurs to one of the storage control units 800 in the same cluster, the other storage control unit 800 in the same cluster can take over the processing of the failed storage control unit 800 to continue the processing. One cache controller 820 is connected to the other cache controller 820 of the other storage control unit 800 in a cluster through an inter-pair connection portion 850. Thus, the storage control units 800 store each other's data in the respective local caches 830 to duplicate the data. The internal IF controller 840 is connected with the global caches 600, the disk control units 400, the channel control units 300, and the other storage control units 800 through the internal connection part 500. It should be noted that each storage control unit 800 may be equipped with the host IF controller 810, the disk IF controller 860, and the internal IF controller 840 without the local cache 830 and the cache controller 820. In this case, the storage control units 800 may be such that the respective internal IF controllers 840 are connected to each other through the inter-pair connection portion 850. Further, data exchanged between the host computer 200 and the storage volumes may be stored in the global caches 600 to be described later, rather than in the local caches 830, or the data may be exchanged therebetween without being stored in the local caches 830 or the global caches 600.

Figure 3:
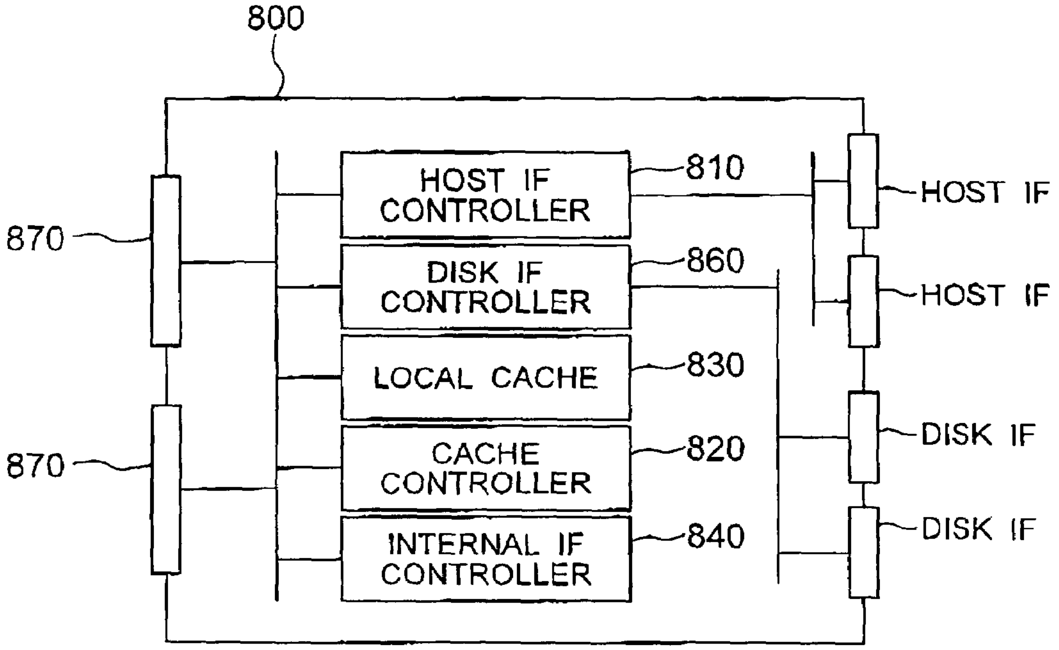
FIG. 3 shows a storage control unit according to the embodiment.
Figure 7:
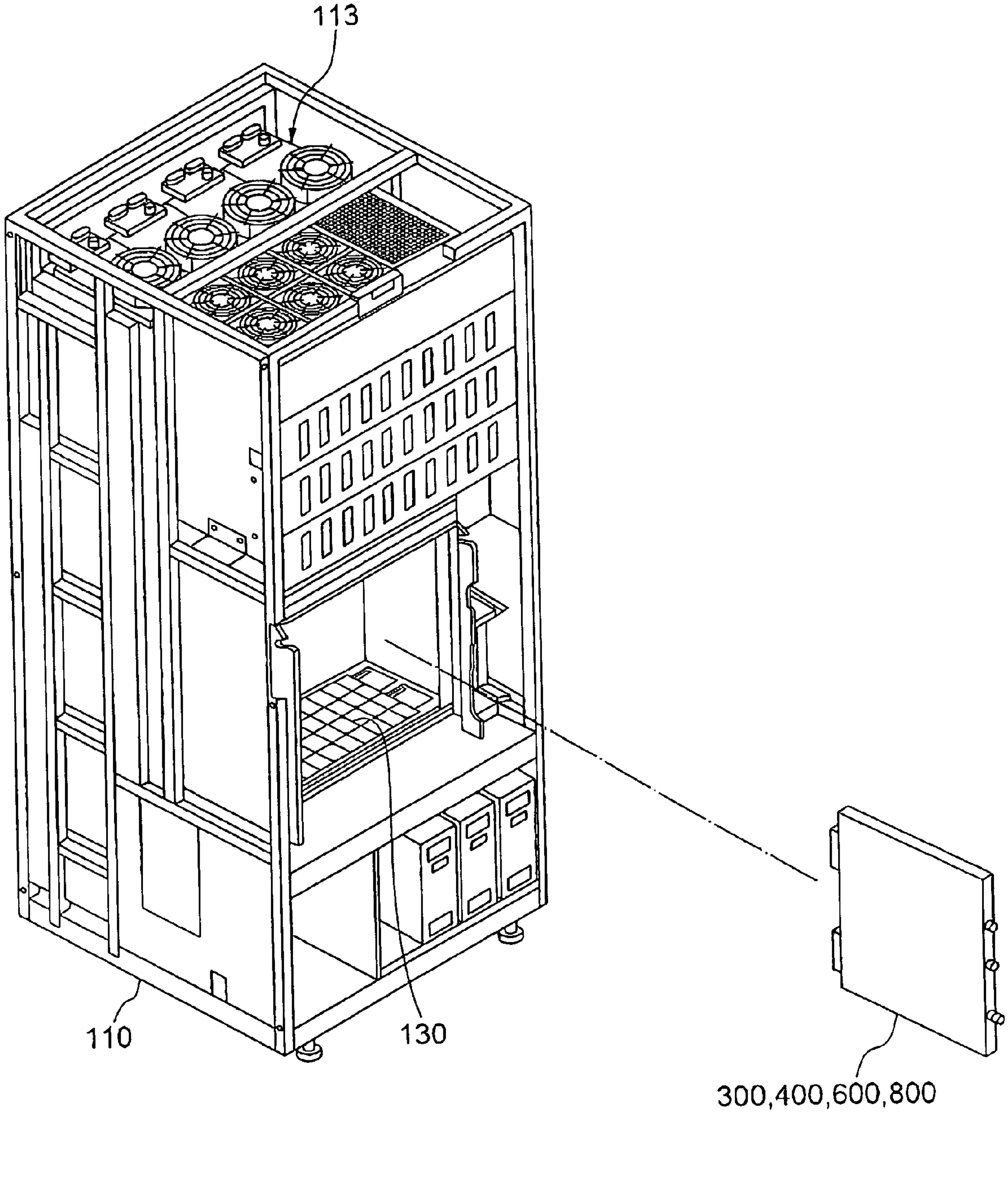
FIG. 7 a perspective view showing how to mount each of the storage control unit, the channel control unit, the disk control unit, and the cache memory unit in the storage system according to the embodiment.

FIG. 3 shows the external appearance of the storage control unit 800 according to the embodiment. The storage control unit 800 is inserted into a mounting part 130 provided in the disk control device 110, thus, mounting the storage control unit 800 in the disk control device 110. FIG. 7 shows how to insert the storage control unit 800 in the mounting part 130 of the disk control device 110. In the mounting part 130, multiple slots are provided each with a guide rail for mounting the storage control unit 800. The storage control unit 800 is inserted along the guide rail so that it can be mounted in the disk control device 110. The storage control unit 800 mounted in each slot can be dismounted by pulling it out along the guide rail. Further, connectors 870 are provided in the storage control unit 800 for electrically connecting the storage control unit 800 and the disk control device 110. The connectors 870 are fitted in the other connectors provided on the front of the back panel of the mounting part 130 in the disk control device 110.

Each slot of the disk control device 110 can accept not only the storage control unit 800, but also the channel control unit 300, the disk control unit 400, and the global cache 600, because these types of units are compatible in size, connector position, connector pin arrangement, etc. Therefore, for example, storage control units 800 may be mounted in all the slots, or the disk control unit 400, the channel control unit 300, and the global cache 600 may be mixed with the storage control unit 800.

As mentioned above, the storage control unit 800 includes a package of the host IF controller 810 having the interface function with the host computer 200, the disk IF controller 860 with the interface function for I/O control to the storage volumes, and the local cache 830 for storing data exchanged between the host computer 200 and the storage volumes This configuration allows for easy expansion of the system by just adding optional storage control units 800 to the system. The package means that multiple functions are modularized into a single part. Maintenance and management such as replacement of parts are carried out on a package basis.

Further, in the storage control unit 800, since the host IF controller 810, the disk IF controller 860, and the local cache 830 are included in the same package, the performance of data X/O between the host computer 200 and the storage volumes can be improved.

This is because the inclusion of these parts in the same package improves electric properties of data transfer paths between the host computer 200 and the storage volumes, enabling high-speed data transfer. In other words, since the host IF controller 810, the disk IF controller 860, and the local cache 830 assume part of the data transfer paths between the host computer 200 and the storage volumes, the inclusion of these parts in the same package can reduce the number of connectors and cables lying in the data transfer paths, and this can, for example, reduce the impedance of the data transfer paths to improve noise immunity. Further, since the host IF controller 810, the disk IF controller 860, and the local cache 830 are arranged close to one another in the same package, the length of each wire interconnecting them can also be reduced not only to reduce the impedance of the data transfer path within the storage control unit 800, but also improve noise immunity. It allows the storage control unit 800 to speed up its data transfer and hence to improve the performance of data I/O between the host computer 200 and the storage volumes.

Further, since the storage control unit 800 is connected both to the host computer 200 and the storage volumes, if data I/O requests from the host computer 200 are made to any of the storage volumes connected to the storage control unit 800, the storage control unit 800 can process the requests without through any other unit. Therefore, processing requiring that the data transfer paths between the host computer 200 and the storage volumes should pass across packages can be reduced to improve data I/O performance.

Further, the storage control unit 800 may control the exchange of data between the host computer 200 and the storage volumes without using the local cache 830. In this case, chances to retard data I/O processing due to passing through the local cache 830 can be made infrequent. This is effective in cases where a high hit rate cannot be expected even using the local cache 830, such as a case where there is no locality in data access to any storage volume performed in response to a data I/O request from the host computer 200.

Further, the use of the storage control unit 800 reduces the frequency of data transfer between the host computer 200 and the storage volumes across packages. Therefore, even in the event of a failure of the storage control unit 800, the influence of the failure on the transfer of data through another storage control unit 800 can be reduced. Likewise, when the storage control unit 800 is replaced, for example, in maintenance work, the influence can also be reduced to a local problem, reducing the influence on the transfer of data through another storage unit 800.

The disk control device 110 using such storage control units 800 is designed to have the best cost-efficiency at the time of initial introduction. Despite its cost-efficiency, since the disk control device 110 still maintain expandability, it is suitable for a wide range from small-and-medium systems to large systems. For example, as will be described later, the storage control unit 800 may be housed in a case together with the power source 112 and the fan 113 to form a module type controller 111, In this case, the module type controller 111 makes the initial introduction of the storage system 100 easy. The expansion of the system is also made easy by just adding module type controllers 111 sequentially to the system. This is effective in implementing a flexible system capable of changing the size of the system according to the needs of customers who may be going to start their businesses or who are facing the ever-changing business climate. Further, data read out by the disk IF controller 860 from a storage volume is stored in a data area 831 of the local cache 830 via the cache controller 820 without through the internal connection part 500 and the global cache 600, thereby achieving high-speed reading.

On the other hand, a disk control device 110 using channel control units 300 and disk control units 400 is designed to maximize the cost-reduction at the largest system based on expectations of maximizing the system. Such a disk control device 110 is suitable for a large computer system and effective for customers with stable business prospects to implement a relatively large system.

As stated above, according to the embodiment, all or any type of units, namely the storage control unit 800, the channel control unit 300, the disk control unit 400, and the global cache 600, can be mounted in the disk control device 110, so that a flexible storage system 100 can be configured according to the needs of various customers.

Figure 8:
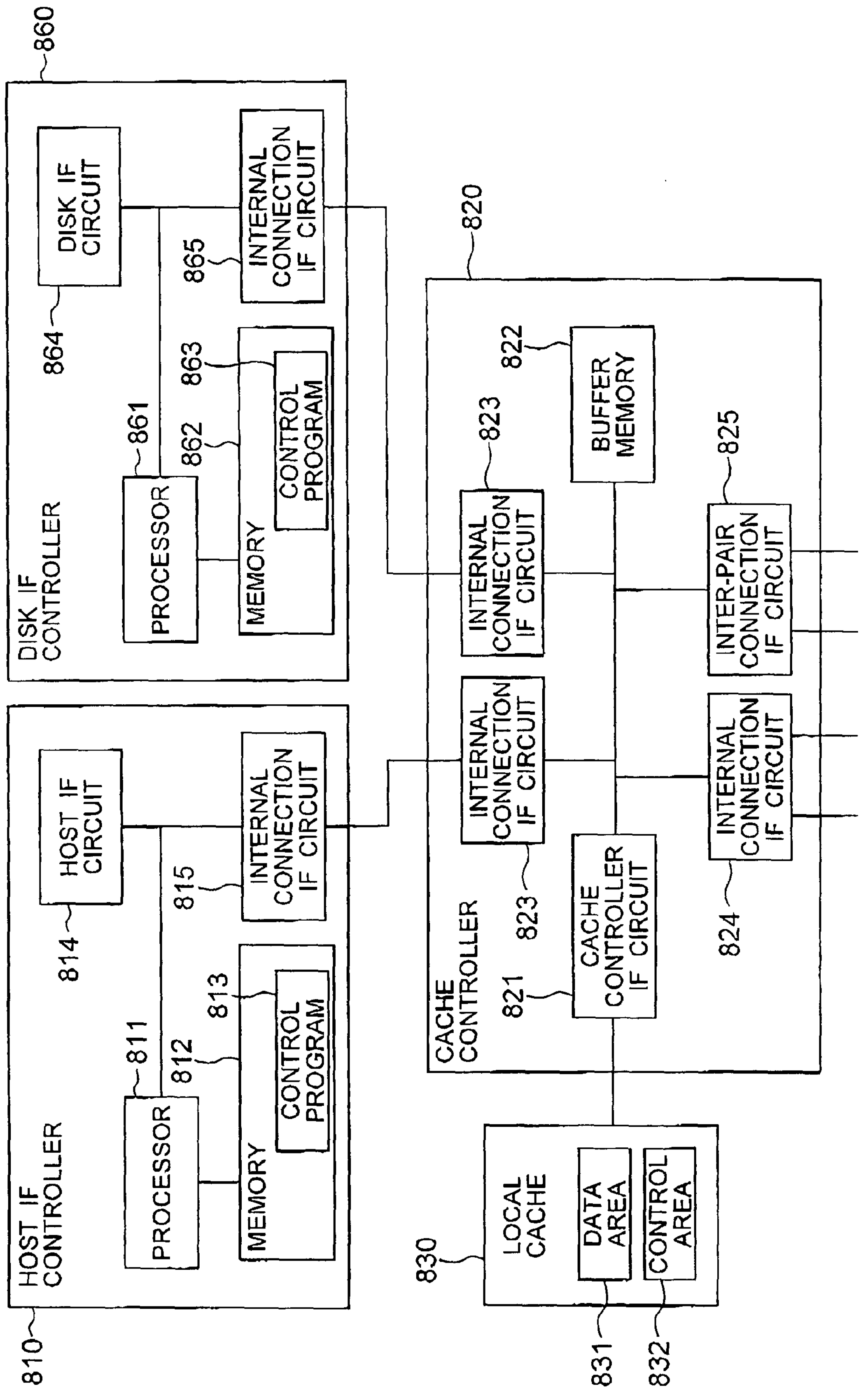
FIG. 8 is a block diagram showing features of the storage control unit according to the embodiment.

FIG. 8 is a block diagram showing the structure of the storage control unit 800.

The host IF controller 810 includes a processor 811, a memory 812, a host IF circuit 814, and an internal connection IF circuit 815. The processor 811 executes a control program 813 stored in the memory 812 to implement the interface with the host computer 200. The host IF circuit 814 is a circuit connected to the host computer 200 to exchange data with the host computer 200. The internal connection IF circuit 815 is a circuit for connection with the cache controller 820.

The cache controller 820 includes a cache controller IF circuit 821, a buffer memory 822, internal connection IF circuits 823, 824, and an inter-pair connection IF circuit 825. The cache controller IF circuit 821 is a circuit for connection with the local cache 830 and control of data exchange with the local cache 830. The buffer memory 822 is used for temporarily storing data exchanged with the local cache 830. The internal connection IF circuits 823 are circuits for connection with the host IF controller 810 and the disk IF controller 860, respectively. The internal connection IF circuit 824 is a circuit for connection with the internal IF controller 840.

Figure 9:
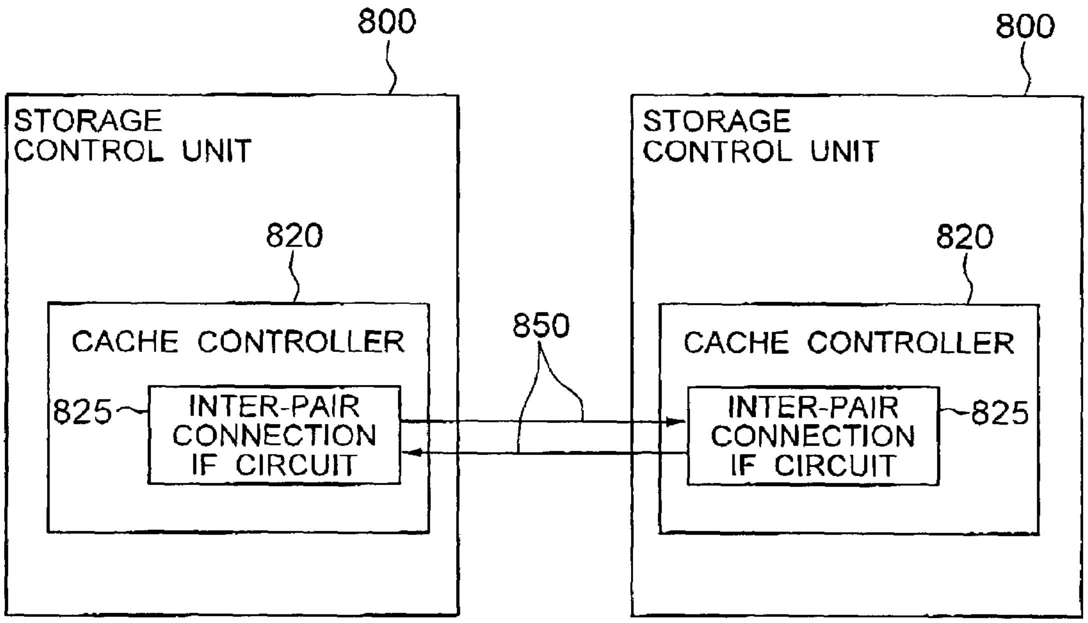
FIG. 9 is a block diagram for explaining an inter-pair connection portion between storage control units according to the embodiment.

The inter-pair connection IF circuit 825 is a circuit for connection with another cache controller 820 of the other storage control unit 800 with which the storage control unit 800 form a cluster. This connection is shown in FIG. 9.

Storage control units 800 in a cluster share data in each other's local caches 330 to duplicate the data. Commands and data for duplicating the data are sent from one storage control unit 800 to the other through the inter-pair connection IF circuit 825. The inter-pair connection IF circuits 825 are directly connected to each other through the inter-pair connection portion 850. The inter-pair connection portion is a communication path provided for duplicating the data in the each other's local caches 830. The inter-pair connection portion 850 can also be used for message communication between storage control units 800 in a cluster, or for exchange of a heart beat signal. The heart beat signal is a signal used for one storage control unit 800 to confirm the operating state of the other in the cluster.

The disk IF controller 860 includes a processor 861, a memory 862, a disk IF circuit 864, and an internal connection IF circuit 865. The processor 861 executes a control program 863 stored in the memory 862 to implement the interface with the disk drives 121. The disk IF circuit 864 is a circuit connected with the disk drives 121 to exchange data with the disk drives 121. The internal connection IF circuit 865 is a circuit for connection with the cache controller 820.

The internal connection IF circuits 815 and 865, the internal connection IF circuits 823 and 824, and the inter-pair connection IF circuit 825 may be of the same type, or different types, or mixed types.

The local cache 830 has a data area 831 and a control area 832. The data area 831 is a storage area for storing data exchanged between the host computer 200 and the storage volumes. The control area 832 is a storage area for control of the data stored in the data area 831. The details of the local cache 830 will be described later.

<<Channel Control Unit>>

Figure 4:
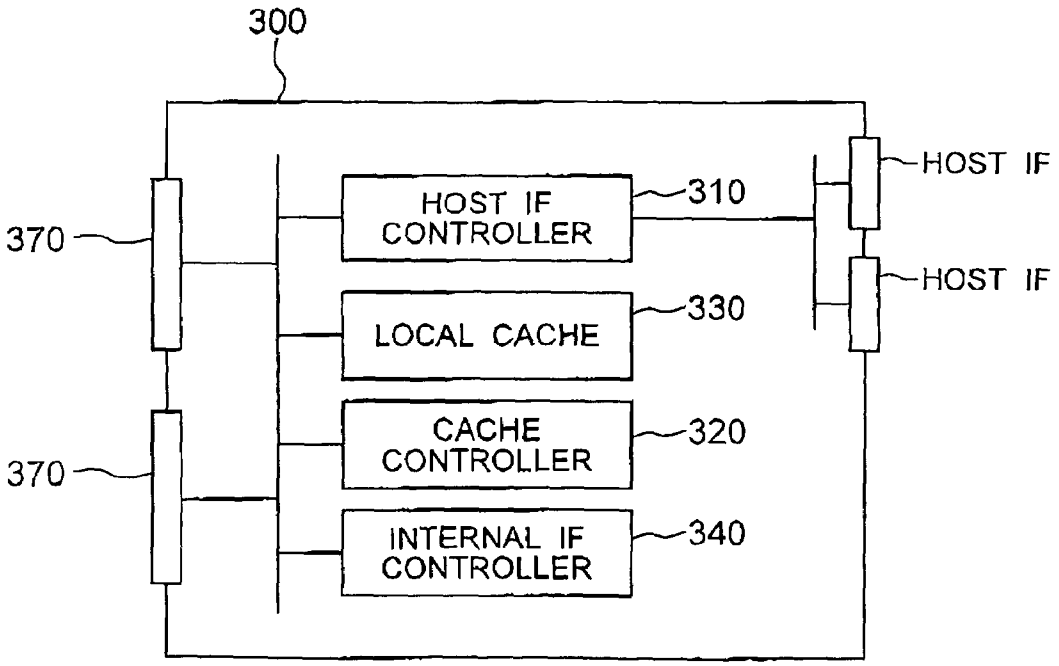
FIG. 4 shows a channel control unit according to the embodiment.
Figure 10:
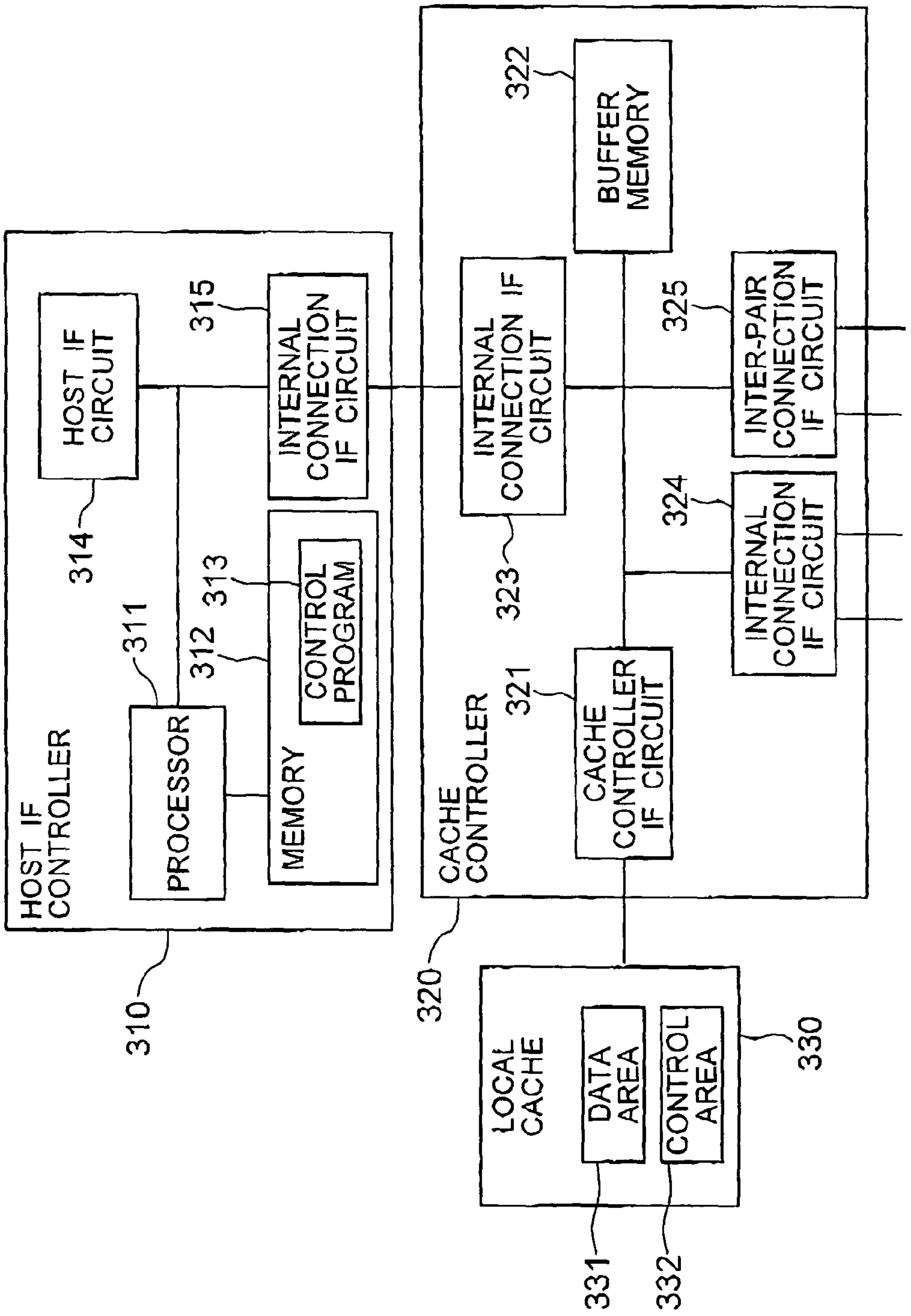
FIG. 10 is a block diagram showing features of the channel control unit according to the embodiment.
Figure 11:
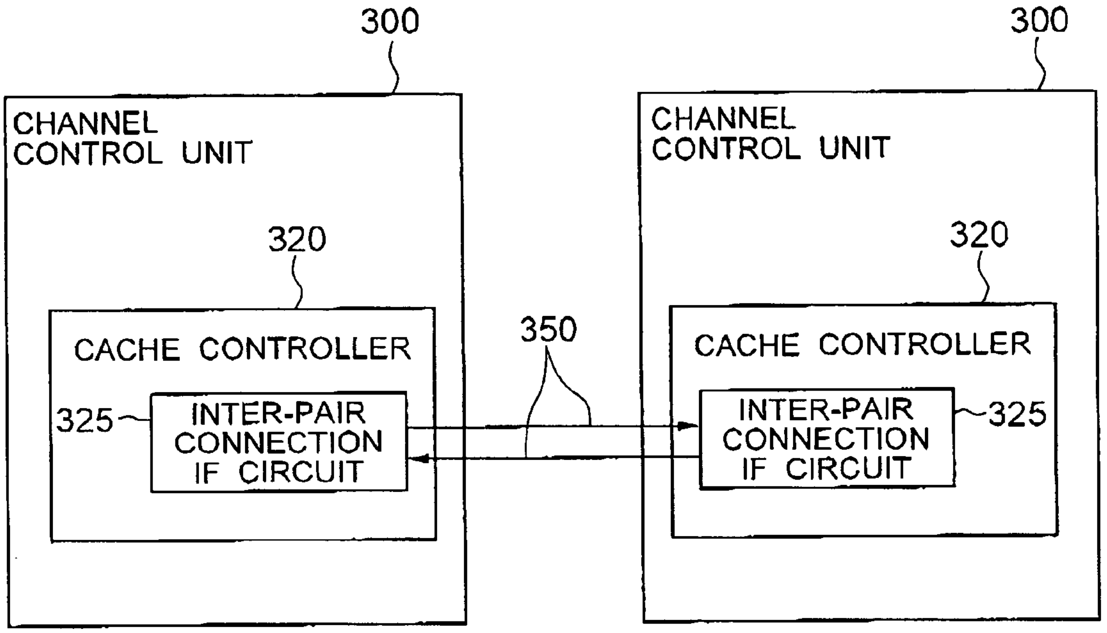
FIG. 11 is a block diagram for explaining an inter-pair connection portion between channel control units according to the embodiment.

FIGS. 10 and 11 are block diagrams showing the structure of the channel control unit 300. FIG. 4 shows the external appearance of the channel control unit 300.

The channel control unit 300 includes a host interface controller (host IF controller) 310, a cache controller 320, a local cache (memory) 330, and an internal interface controller (internal IF controller) 340. The channel control unit 300 is implemented as an integral unit of hardware elements formed on a circuit board, software executed on the hardware unit, or both.

The host IF controller 310 has an interface function with a host computer 200. The host IF controller 310 includes a processor 311, a memory 312, a host IF circuit 314, and an internal connection IF circuit 315. The features implemented by the host IF controller 310 and its internal arrangement are the same as the host IF controller 810.

The cache controller 320 and the local cache 330 are operative to store data exchanged between the host computer 200 and the storage volumes. The features implemented by the cache controller 320 and the local cache 330, and their internal arrangements are also the same as the cache controller 820 and the local cache 830 of the storage control unit 800, respectively.

Further, the features implemented by the internal IF controller 340 and its internal arrangement are the same as the internal IF controller 840 of the storage control unit 800.

Like the storage control unit 800, the channel control unit 300 is inserted into each slot provided in mounting part 130 of the disk control device 110, thus mounting the channel control unit 300 in the disk control device 110. FIG. 7 shows how to insert the channel control unit 300 in the mounting part 130 of the disk control device 110. The channel control unit 300 is provided with connectors 370 for electrically connecting the channel control unit 300 and the disk control device 110. The connectors 370 are fitted in the other connectors provided on the front of the back panel of the mounting part 130 of the disk control device 110. As stated above, the channel control unit 300 is compatible with the other units in size, connector position, connector pin arrangement, etc. Therefore, the storage control unit 800, the channel control unit 300, the disk control unit 400, and the global cache 600 can be mixed and inserted in the slots of the disk control device 110.

<<Disk Control Unit>>

Figure 5:
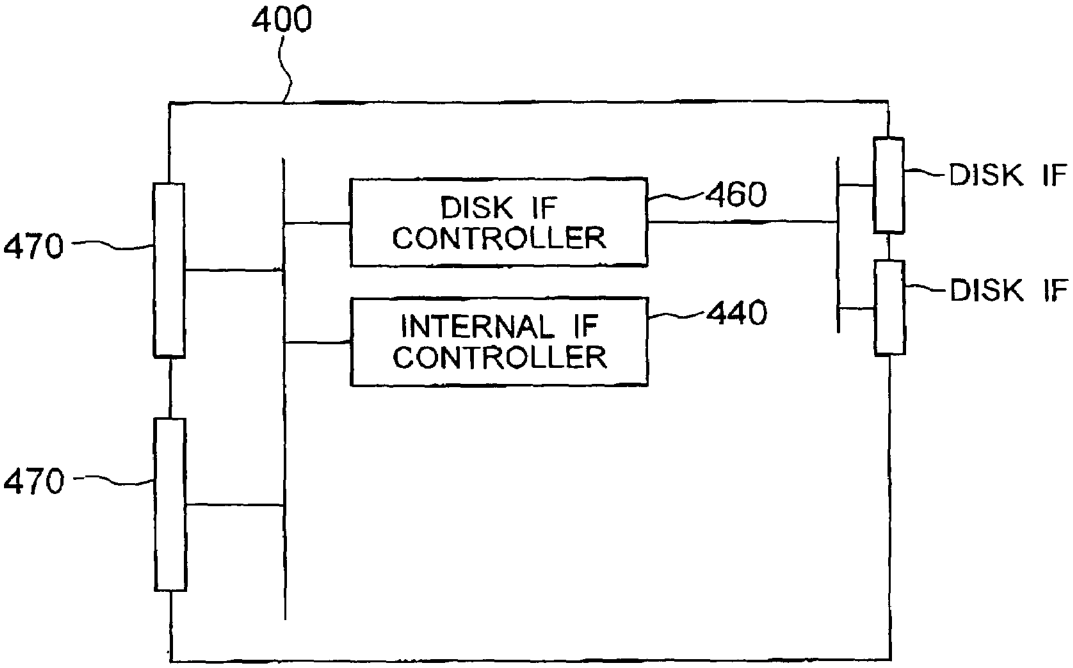
FIG. 5 shows a disk control unit according to the embodiment.
Figure 12:
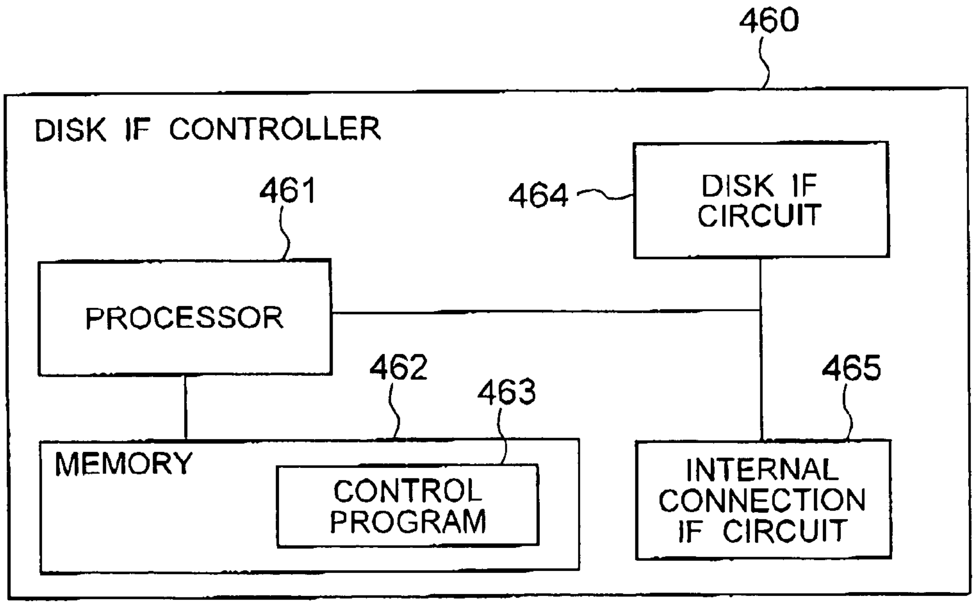
FIG. 12 is a block diagram showing features of the disk control unit according to the embodiment.

FIG. 12 is a block diagram showing the structure of the disk control unit 400. FIG. 5 shows the external appearance of the disk control unit 400.

The disk control unit 400 includes a disk interface controller (disk IF controller) 460, and an internal interface controller (internal IF controller) 440. The disk control unit 400 is implemented as an integral unit of hardware elements formed on a circuit board, software executed on the hardware unit, or both.

The disk IF controller 460 has an interface function for I/O control to the storage volumes 121. The disk IF controller 460 includes a processor 461, a memory 462, a disk IF circuit 464, and an internal connection IF circuit 465. The features implemented by the disk IF controller 460 and its internal arrangement are the same as the disk IF controller 860 of the storage control unit 800.

The features implemented by the internal IF controller 440 and its internal arrangement are also the same as the internal IF controller 840 of the storage control unit 800.

Like the storage control unit 800, the disk control unit 400 is inserted into each slot provided in mounting part 130 of the disk control device 110, thus mounting the disk control unit 400 in the disk control device 110. FIG. 7 shows how to insert the disk control unit 400 in the mounting part 130 of the disk control device 110. The disk control unit 400 is provided with connectors 470 for electrically connecting the disk control unit 400 and the disk control device 110. The connectors 470 are fitted in the other connectors provided on the front of the back panel of the mounting part 130 of the disk control device 110. As stated above, the disk control unit 400 is compatible with the other units in size, connector position, connector pin arrangement, etc. Therefore, the storage control unit 800, the channel control unit 300, the disk control unit 400, and the global caches 600 can be mixed and inserted in the slots of the disk control device 110.

<<Local Cache>>

Figure 13:
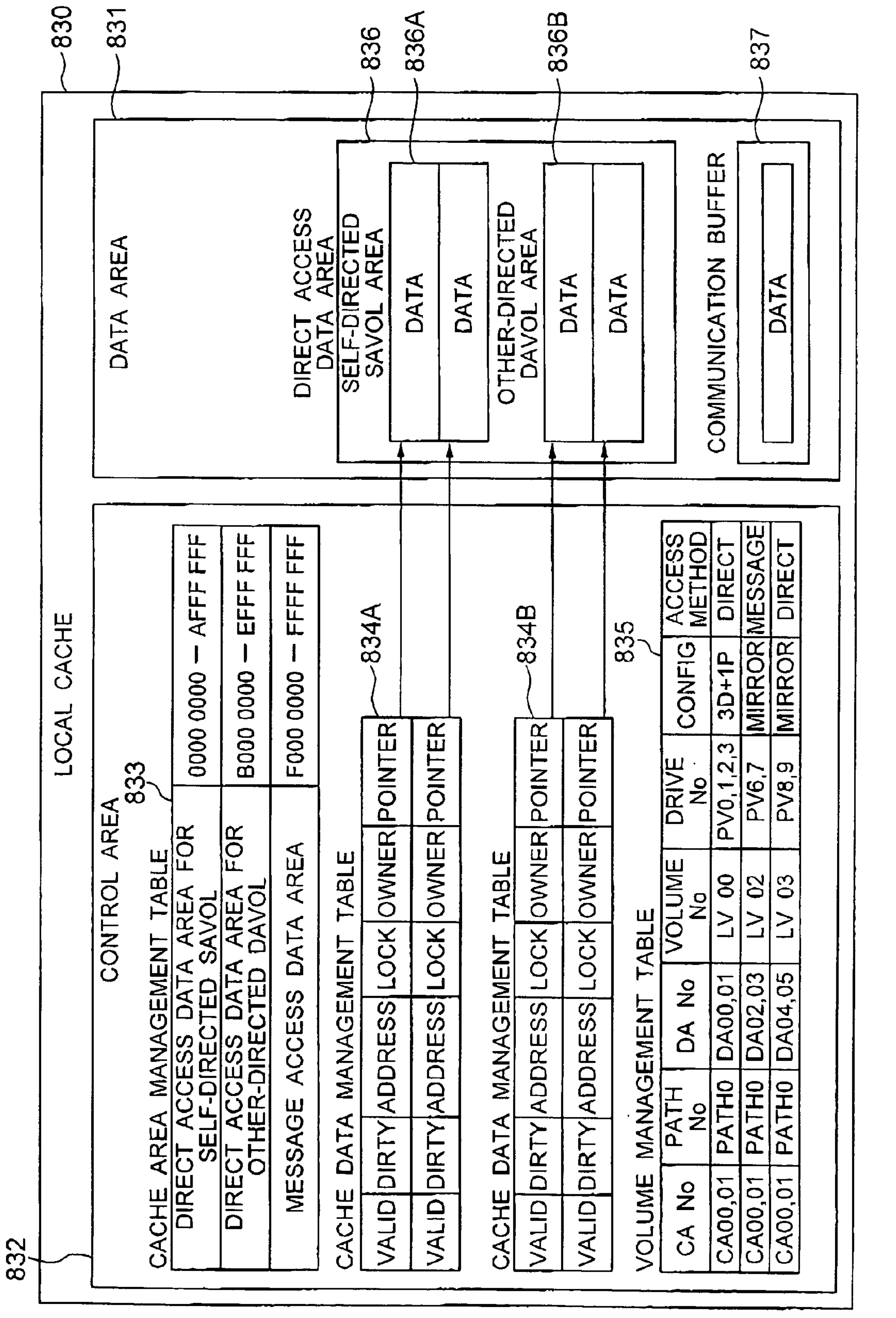
FIG. 13 is a block diagram showing the structure of a local cache memory according to the embodiment.

Referring next to FIG. 13, a description will be made of the local cache 830 provided in the storage control unit 800. It should be noted that the local cache 330 provided in the channel control unit 300 has the same features and structure as the local cache 830 of the storage control unit 800.

The local cache 830 has a data area 831 and a control area 832. The data area 831 is a storage area for storing data exchanged between the host computer 200 and the storage volumes. The control area 832 is a storage area for control of the data stored in the data area 831.

The data area 831 has a direct access data area 836 and a communication buffer 837. The direct access data area 836 is divided into a self-directed SAVOL (Storage Adapter VOLume) area (first storage area) 836A and an other-directed DAVOL (Disk Adapter VOLume) area (second storage area) 836B.

The self-directed SAVOL area 836A is an area for storing data exchanged between the host computer 200 and storage volumes in the case where data I/O requests from the host computer 200 are directed to the storage volumes connected to the storage control unit 800 that has received the data I/O requests.

The other-directed DAVOL area 836B is an area for storing data exchanged between the host computer 200 and storage volumes in the case where data I/O requests from the host computer 200 are directed to storage volumes connected to a disk control unit(s) 400. The other-directed DAVOL 836B is provided when any disk control 400 is mounted in the disk control device 110.

The communication buffer 837 is a storage area which, when data I/O requests from the host computer 200 are directed to storage volumes connected to a storage control unit 800 other than the storage control unit that has received the data I/O requests, exchanges the I/O requests and data with the other storage control unit 800 concerned. The communication buffer 837 is provided when two or more storage control units 800 in different clusters are mounted in the disk control device 110.

The control area 832 contains a cache area management table 833, a cache data management table 834, and a volume management table 835. In the example of FIG. 13, although the control area 832 contains one cache area management table 833, two cache data management tables 834A and 834B, and one volume management table 835, each of these tables may be divided into two or more tables as appropriate.

The cache area management table 833 holds information for specifying respective storage areas of the self-directed SAVOL 836A, the other-directed DAVOL 836B, and the communication buffer 837 provided in the data area 831. The information for specifying the storage areas is, for example, local cache address information. In the example of FIG. 13, the data area 831 is allocated to addresses in which the self-directed SAVOL area 836A ranges from addresses "00000000" to "AFFFFFFF," the other-directed DAVOL area 836B ranges from addresses "B0000000" to "EFFFFFFF," and the communication buffer 837 ranges from addresses "F0000000" to "FFFFFFFF." The allocation of addresses for each area can be changed by making a change in the contents of the cache area management table 833. For example, if many of data I/O requests from the host computer 200 are directed to storage volumes connected to the storage control unit 800 that has received the data I/O requests, the allocation of addresses for the self-directed SAVOL area 836A can be increased, As a result, since it can be expected that the cache hit rate of the local cache 830 to the data I/O requests from the host computer 200 will increase, the performance of the storage system 100 can be improved. The change in the contents of the cache area management table 833 can be made, for example, on the management terminal 160 by an operator doing maintenance of the storage system 100.

The cache data management table 834 is a table for managing data stored in the data area 831. The cache data management table 834 has a "Valid" column, a "Dirty" column, an "Address" column, a "Lock" column, an "Owner" column, and a "Pointer" column for each data block.

Each of the data blocks stored in the data area 831 can be any unit of data, and it can include but not limited to a block unit, cylinder unit, and track unit of a disk drive 121. Further, the length of each data block may be a variable length or fixed length.

The "Valid" column indicates whether data in the data block is valid. When data is found in the data area 831 in response to a data reading request from the host computer 200, the cache access will be a misshit unless the data is valid.

The "Dirty" column indicates whether data read out from a storage volume to the local cache 830 has been rewritten by the host computer 200. When having been rewritten, the data needs to be written back to the disk drive 121 concerned, or when not having been rewritten, the data does not need to be written back to the disk drive 121 concerned.

The "Address" column indicates the storage position of data in the local cache 830.

The "Lock" column indicates whether to prohibit processing of data stored in both local caches 830 of the storage control units 800 in a cluster. One local cache 830 is connected to the other local cache 830 in the same cluster through the inter-pair connection portions 850 as dual-redundant data communication paths, so that when data stored in one local cache 830 is updated, the updated data is duplicated and stored in the other local cache 830. The duplication of data cannot be done exactly at the same time, and a mismatch would necessarily occur between data stored in both local caches 830, though it is a very short period of time. During the time period for which both data do not match with each other, if for example the data is replaced from one local cache 830 (that is, if the data is written back to a corresponding global cache 600 or a corresponding disk drive 121), erroneous data may possibly be stored in the global cache 600 or the disk drive 121. To avoid such a problem, the "Lock" column is provided for prohibiting any control of the data, such as to update or replace the data, during the period for which the Lock is effective.

The "Owner" column indicates which local cache 830 operating in a pair owns the data. Since data is duplicated and stored in a pair, the "Owner" column is provided for managing in which the data belongs.

The "Pointer" column is a column for managing correspondences between data stored in the data area 831 and the items of the cache data management tables 834 stored in the control area 832.

The volume management table 835 holds information for specifying a unit responsible for I/O control to a storage volume to which a data I/O request from the host computer 200 is directed. The volume management table 835 has a "CA No" column, a "path No" column, a "DA No" column, a Volume No" column, a "drive No" column, a "Config" column, and an "AccessMethod" column.

The "CA No" column holds identification Numbers assigned to host IF controllers 810 of storage control units 800 or host IF controllers of channel control units 300 mounted in the disk control device 110. In the example of FIG. 13, CA00 and CA01 are entered in the "CA No" column. As shown in FIG. 2, CA00 and CA01 represent the host IF controllers B10 of the storage control units 800 in a cluster.

The "path No" column holds identification numbers assigned to paths each designating a local volume 122 accessible from the host computer 200. In the embodiment, a path is assigned to each storage control unit 800 or channel control unit 300. Therefore, the same path number assigned for different units indicates different paths. The path number may also be a unique number in the whole storage system 100.

The "DA No" field holds identification numbers assigned to disk IF controllers 860 of storage control units 800 or disk IF controllers 460 of disk control units 400 mounted in the disk control device 110. In the example of FIG. 13, DA00 and DA01, DA02 and DA03, and DA04 and DA05 are entered in the "DA No" column. DA00 and DA01 represent disk IF controllers 860 of the same storage control units 800 as those including the host IF controllers 810 identified with CA00 and CA01. DA02 and DA03 represent disk IF controllers 860 of storage control units 800 different from those including the host IF controllers 810 identified with CA00 and CA01. DA04 and DA05 represent disk IF controllers 460 of disk control units 400 different from the storage control units 800 including the host IF controllers 810 identified with CA00 and CA01. When receiving at CA00 and CA01 data I/O requests from the host computer 200, the storage control units 800 process all the I/O requests regardless of whether they are directed to storage volumes connected with their own disk IF controllers 860 or to storage volumes connected with disk IF controllers 860 or 460 of another pair of storage control units 600 or disk control units 400.

The "Volume No" field designates a logical volume 122 connected with the disk IF controllers 860 or 460 specified in the "DA No" field.

The "drive No" field designates disk drives 121 connected with the disk IF controllers 860 or 460 specified in the "DA No" field.

The "Config" field holds configurations of RAIDs (Redundant Arrays of Inexpensive Disks) set on the disk drives 121 specified in the "drive No" field.

The "AccessMethod" field designates a method of I/O control to storage volumes to which data I/O requests received from the host computer 200 are directed. In the field, "direct" means that I/O control is performed on the data based on the data storage address specified by a corresponding data I/O request received from the host computer 200, and "message" means that the data I/O request received from the host computer 200 is sent to the storage control units 800 or disk control units 400 including the disk IF controllers 860 or 460 specified in the "DA No" field. Then, upon receipt of the data I/O request, the storage control units 800 or disk control units 400 concerned perform I/O control.

Thus, the use of the volume management table 835 enables even the disk control device 110 in which different types of units are mixed and mounted to perform data I/O control in response to any data I/O request from the host computer 200.

The volume management table 835 may also have a field which holds address information for designating areas of disk drives 121.

<<Global Cache>>

Figure 6:
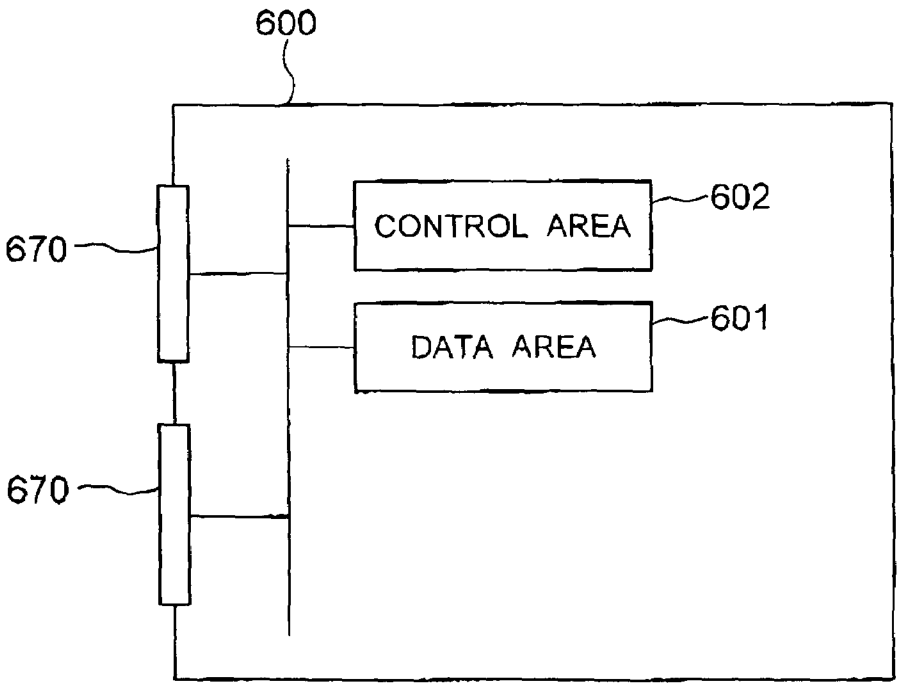
FIG. 6 shows a cache memory unit according to the embodiment.
Figure 14:
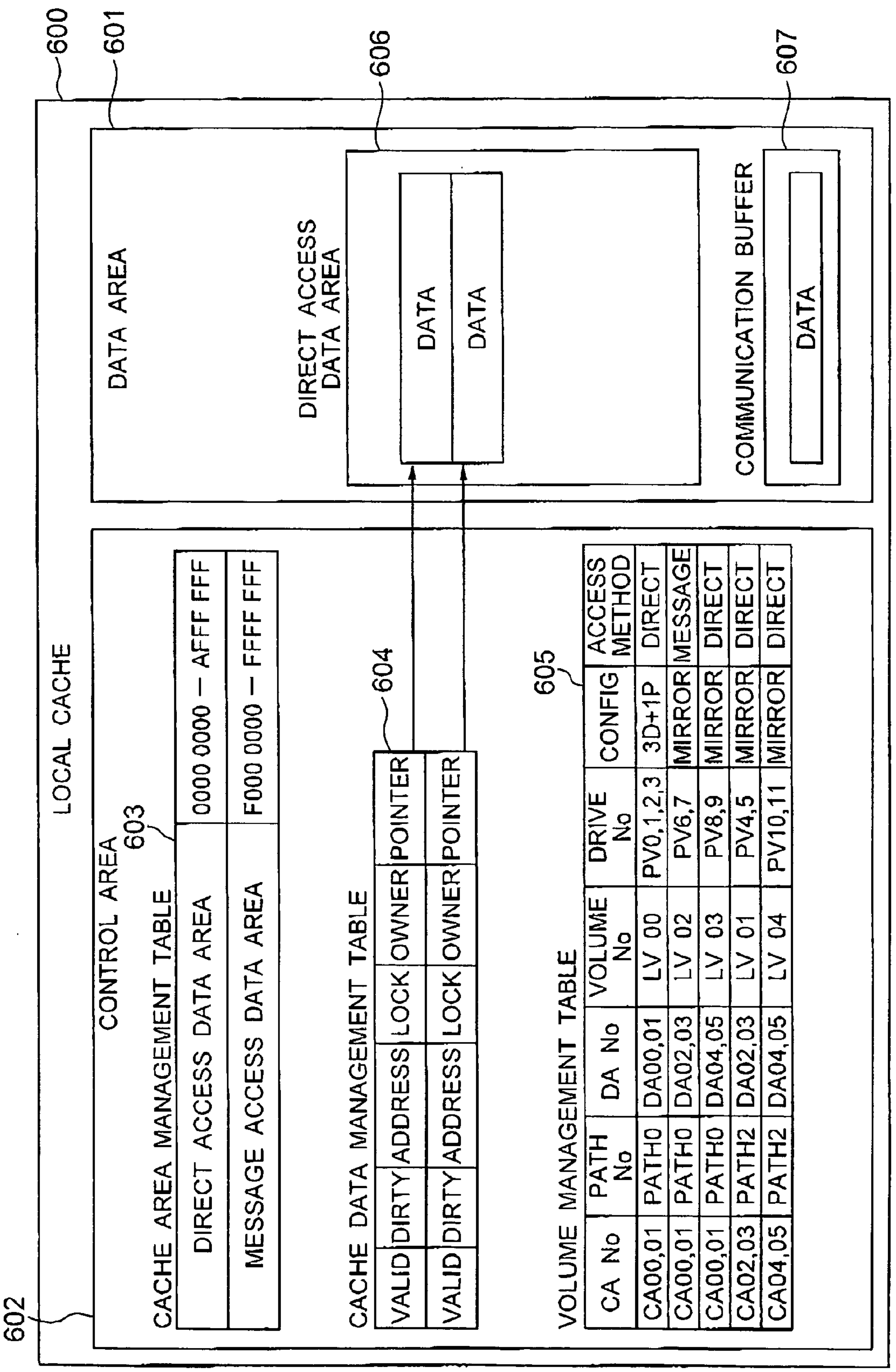
FIG. 14 is a block diagram showing the structure of a global cache memory according to the embodiment.

FIG. 14 is a block diagram showing the structure of the global cache 600. FIG. 6 shows the external appearance of the global cache 600.

Like the storage control unit 800, the channel control unit 300, and the disk control unit 400, the global cache 600 is inserted into a slot provided in the mounting part 130 of the disk control device 110, thus, mounting the global cache 600 in the disk control device 110. FIG. 7 shows how to insert the global cache 600 in the mounting part 130 of the disk control device 110. The global cache 600 is provided with connectors 670 for electrically connecting the global cache 600 and the disk control device 110. The connectors 670 are fitted in the other connectors provided on the front of the back panel of the mounting part 130 of the disk control device 110. As stated above, the global cache 600 is compatible with the other units in size, connector position, connector pin arrangement, etc. Therefore, the storage control unit 800, the channel control unit 300, the disk control unit 400, and the global cache 600 can be mixed and inserted in the slots of the disk control device 110.

The global cache 600 has a data area 601 and a control area 602. The data area 601 is a storage area for storing data exchanged between the host computer 200 and the storage volumes. The control area 602 is a storage area for control of the data stored in the data area 601.

The data area 601 has a direct access data area 606 and a communication buffer 607.

The direct access data area 606 is an area for storing data exchanged between the host computer 200 and the storage volumes.

The communication buffer 607 is a storage area used when data I/O requests and data are exchanged between storage control units 800. The communication buffer 607 may also be used when data I/O requests and data are exchanged between storage control units 800 and disk control units 400. Further, if each local cache 830 is provided with a communication buffer 837, the communication buffer 607 may be omitted from the global cache 600. On the contrary, if the global cache 600 is provided with the communication buffer 607, the communication buffer 837 may be omitted from the local cache 830.

The control area 602 holds a cache area management table 603, a cache data management table 604, and a volume management table 605. In the example of FIG. 14, although the control area 602 contains one cache area management table 603, one cache data management tables 604, and one volume management table 605, each of these tables may be divided into two or more tables as appropriate.

The cache area management table 603 holds information for specifying respective storage areas of the direct access data area 606 and the communication buffer 607 provided in the data area 601. The information for specifying the storage areas is, for example, address information in the global cache 600. In the example of FIG. 14, the data area 601 is allocated to addresses in which the direct access data area 606 ranges from addresses "00000000" to "AFFFFFFF," and the communication buffer 607 ranges from addresses "F0000000" to "FFFFFFFF." Any change in the contents of the cache area management table 603 can be made, for example, on the management terminal 160 by an operator doing maintenance of the storage system 100. Thus the global cache 600 can be set according to the characteristics of data I/O requests from the host computer 200, thereby improving the performance of the storage system 100.

The cache data management table 604 is a table for managing data stored in the data area 601. The cache data management table 604 has basically the same field structure as the cache data management table 834 of the local cache 830, except that the meanings of the "Lock" and "Owner" fields are different from those in the cache data management table 834.

The "Lock" field indicates a state in which data in the global cache 600 is read out into a local cache 830, and because there is a possibility that the host computer 200 may update the data, the reading of the data into any other local cache 830 is prohibited. If two or more local caches 830 are allowed to read the data, it will be difficult to secure the consistency of the data because of the possibility that the host computer 200 may update one or more of the local caches independently.

The "Owner" field indicates a local cache 830 into which the data is being read.

The global cache 600 is connected to the internal connection part 500, and two global caches 600 are used in a pair to duplicate the data. The duplication of the data between the global caches 600 is made by mutually transferring the data through the internal connection part 500.

The volume management table 605 of the global cache 600 is a copy of the volume management table 835 of the local cache 830. If there are two or more local caches 830, the volume management table 605 will be combined one of copies of volume management tables of respective local caches 830.

For example, suppose that a storage control unit 800 has received a data I/O request from the host computer 200. Suppose further that the storage control unit 800 consulted its own local cache 830 but was not be able to identify a storage volume to which the data I/O request is directed. In such a case, the storage control unit 800 can consult the volume management table 605 of the global cache 600 to identify a unit to perform I/O control to the storage volume concerned.

<<Internal Connection Part>>

Figure 15:
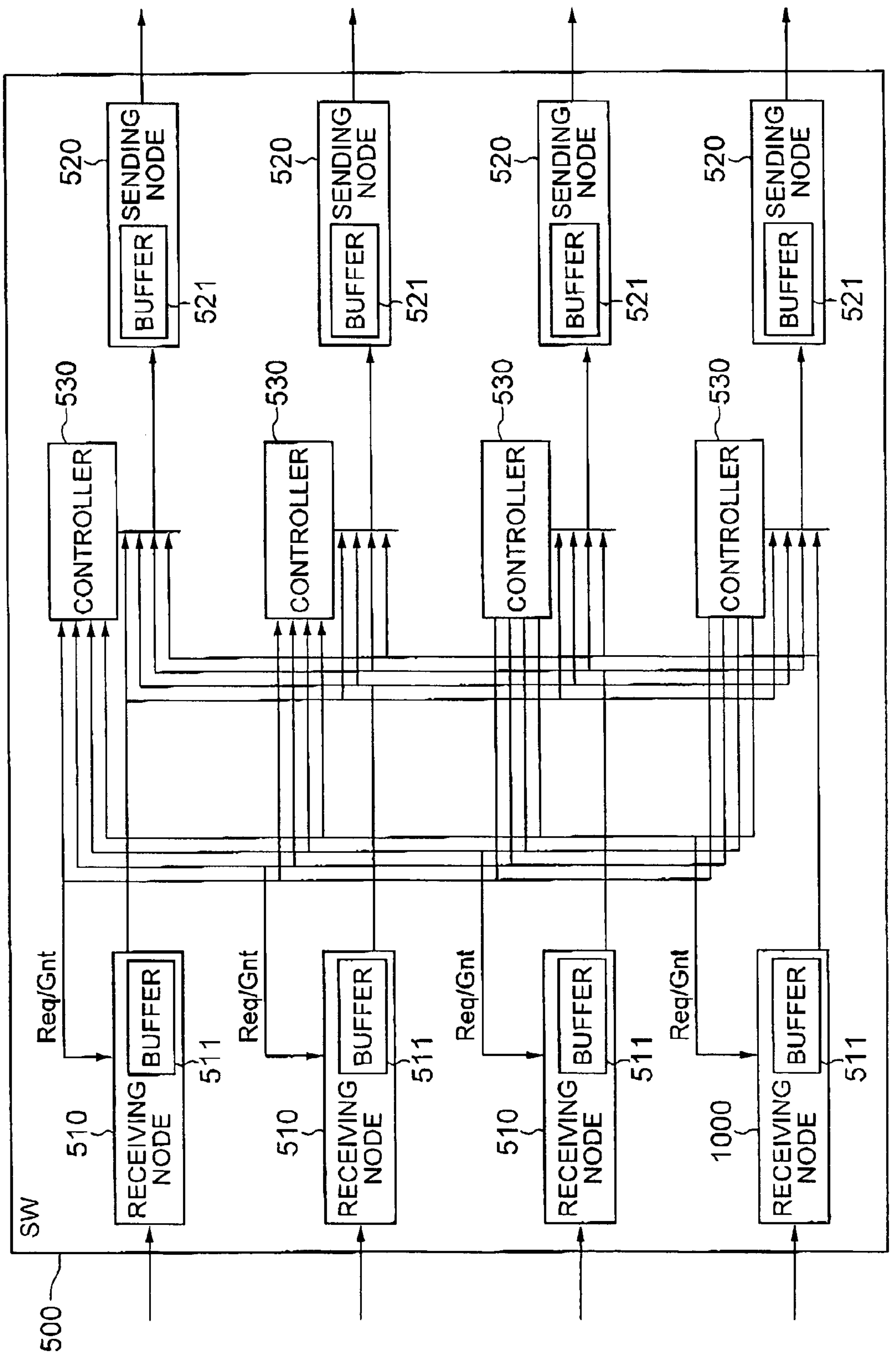
FIG. 15 is a block diagram showing the structure of an internal connection part according to the embodiment.

FIG. 15 is a block diagram showing the structure of the internal connection part 500 according to the embodiment.

The internal connection part 500 is a switch to interconnect the storage control units 800, the channel control units 300, the disk control units 400, and the global caches 600. FIG. 15 shows a four input/four output switch, but the number of actual inputs and outputs would depend on the number of units mountable in the disk control device 110.

The internal connection part 500 includes receiving nodes 510, sending nodes 520, and controllers 530. The receiving nodes 510 store in respective buffers 511 data inputted to the internal connection part 500, and in accordance with instructions from the controllers 530, transfer each data to a specified buffer 521 of each of the sending nodes 520. The sending nodes 520 sequentially output data stored in their buffers 521. In FIG. 15, the internal connection part 500 takes the form of a crossbar switch, but it is not limited to such a crossbar switch, and it can take various forms. For example, the receiving nodes and the sending nodes may be connected through multistage switching circuits.

<<Management Terminal>>

Figure 16:
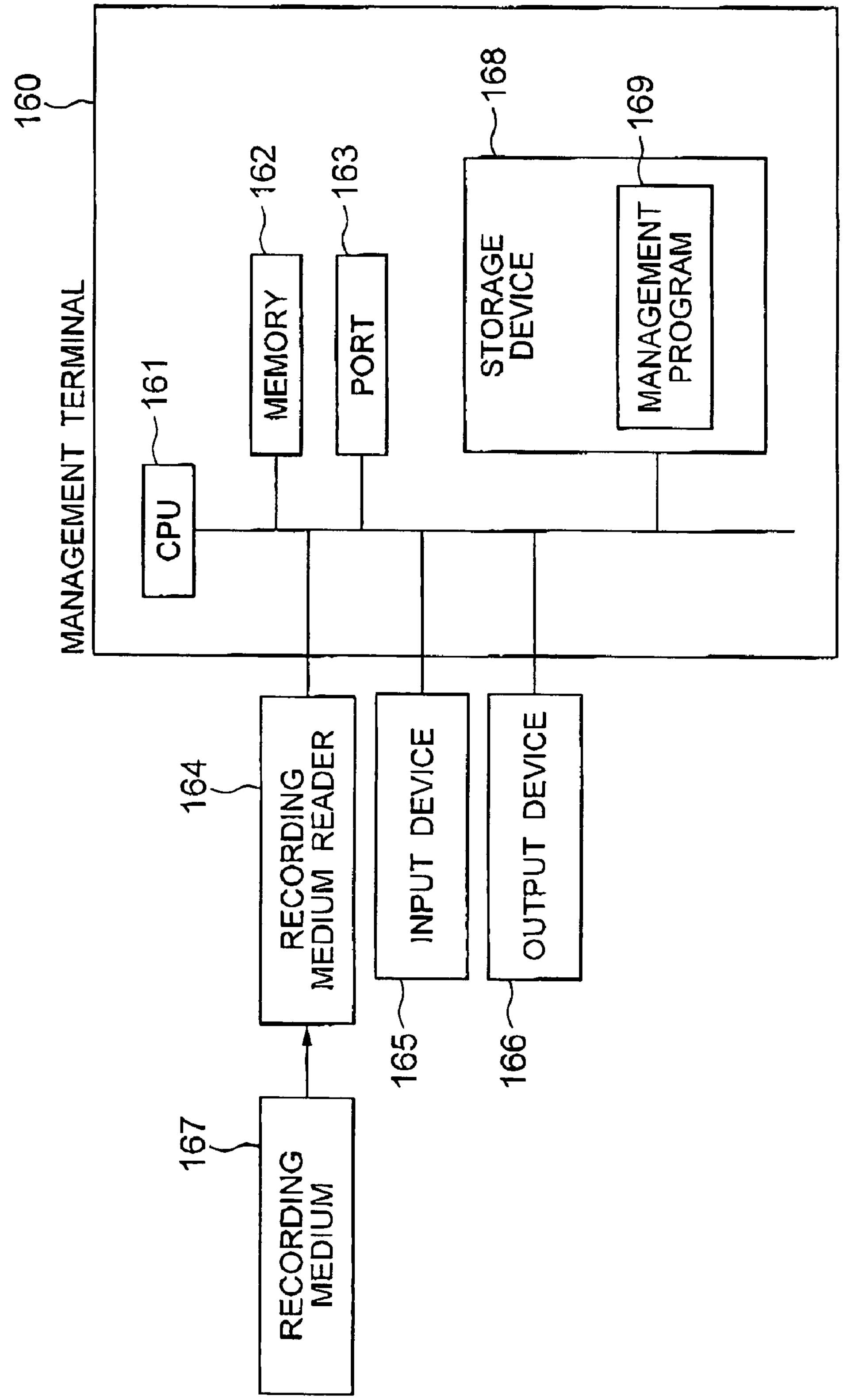
FIG. 16 is a block diagram showing the structure of a management terminal according to the embodiment.

FIG. 16 is a block diagram showing the structure of the management terminal 160 according to the embodiment.

The management terminal 160 includes a CPU 161, a memory 162, a port 163, a recording medium reader 164, an input device 165, an output device 166, and a storage device 168.

The CPU 161 controls the entire operation of the management terminal 160. The CPU 161 reads a management program 169 from the storage device 168 into the memory 162 as appropriate to execute the program so that various features for maintenance of the storage system 100 will be implemented. For example, it can set a logical volume on a disk drive group and install the program 813 executed in the host IF controller 810 of the storage control unit 800. The recording medium reader 164 reads programs and data recorded on a recording medium 167. The read programs and data are stored in the memory 162 or the storage device 168. Thus, for example, the management program 169 or the program 813 recorded on the recording medium 167 can be read out of the recording medium 167 with the recording medium reader 164 and stored in the memory 162 or the storage device 168. The recording medium 167 may be a flexible disk, CD-ROM, DVD-ROM, semiconductor memory, etc. The recording medium reader 164 may be incorporated in the management terminal 160, or added externally. The management program 169 is stored in the storage device 168. The storage device 168 is, for example, a hard disk drive or semiconductor storage device. The input device 165 is used for the operator to enter data into the management terminal 160. The input device 165 includes a keyboard and a mouse, for example. The output device 166 is to output information to the outside world, and includes a display and a printer, for example. The port 163 is to communicate with the disk control device 11Q. The port 163 can also be used to communicate with another computer, not shown. In this case, for example, the program 813 can be received from another computer through the port 163 and installed in the storage control unit 800.

<<Expansion of Controller>>

Figure 17:
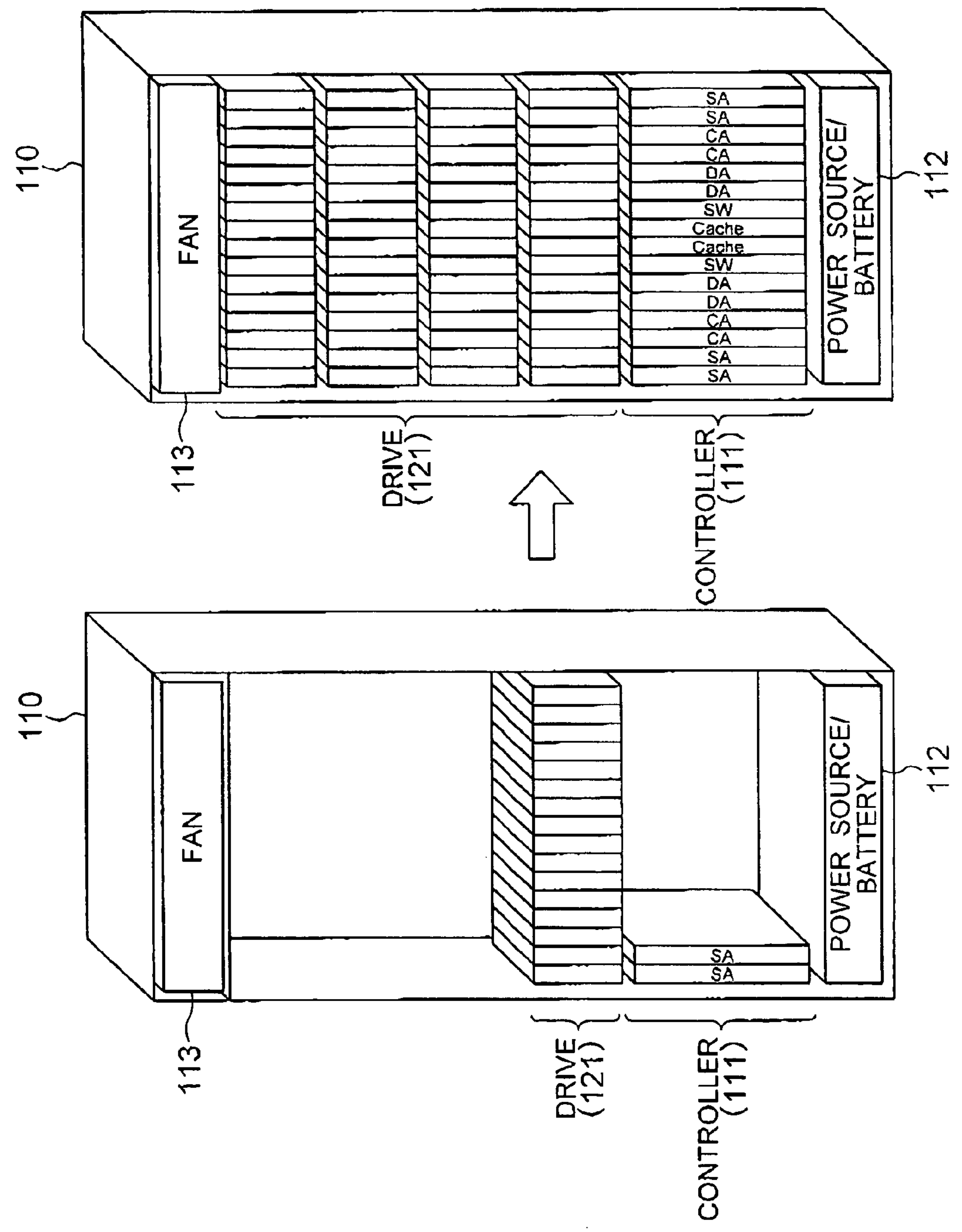
FIG. 17 shows the external appearance of an example of scaling up of the storage system according to the embodiment.

As stated above, in the storage system 100 according to the embodiment, the storage control unit 800, the channel control unit 300, the disk control unit 400, and the global cache 600 can be mixed and mounted in the disk control device 110. Therefore, the storage system 100 can flexibly respond to customers' different requests. For example, a small storage system 100 composed of a small number of disk drives 121 and storage control units 800 may be provided at the time of initial introduction. Then, some other storage control units 800, channel control units 300, disk control units 400, and/or global caches 600 may be added as each customer's business grows. Thus the size of the storage system 100 can be scaled up according to the needs of the customer. FIG. 17 shows how to increase the size of the storage system 100, and FIG. 18 shows the structure of the storage system 100 initially introduced and before being scaled up.

Figure 18:
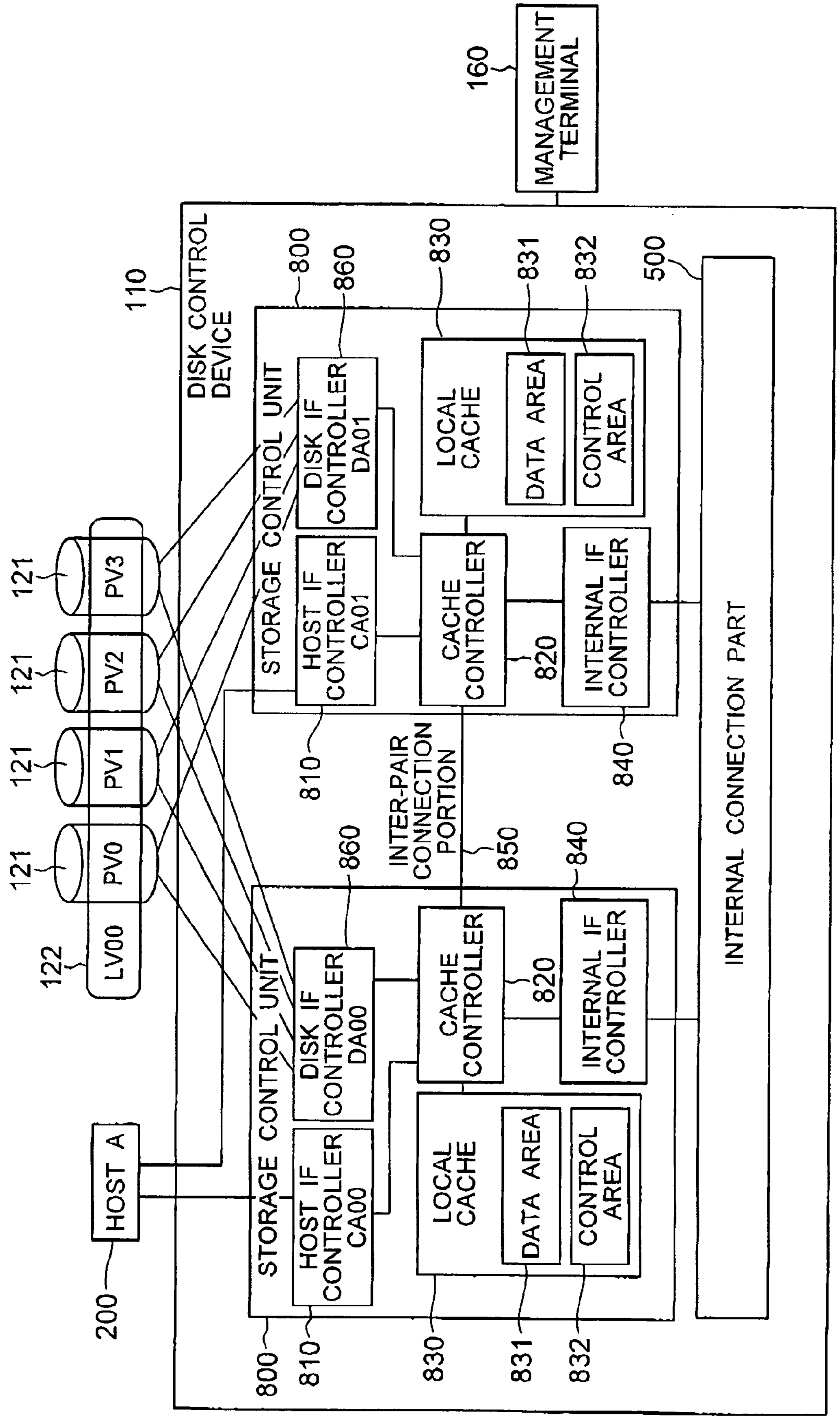
FIG. 18 is a block diagram showing an example of the storage system before scaled up according to the embodiment.
Figure 19:
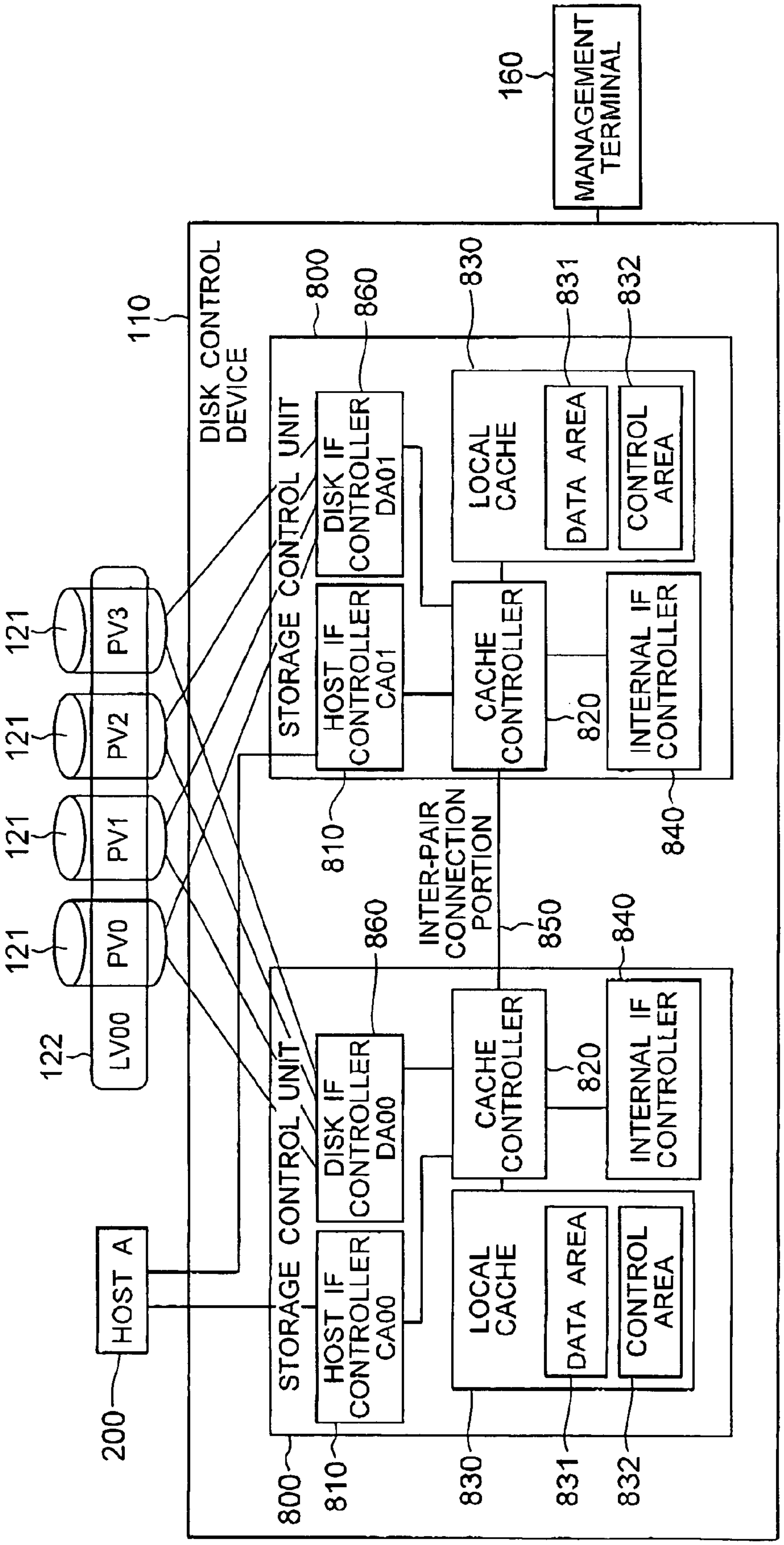
FIG. 19 is a block diagram showing an example of the storage system before scaled up according to the embodiment.
Figure 20:
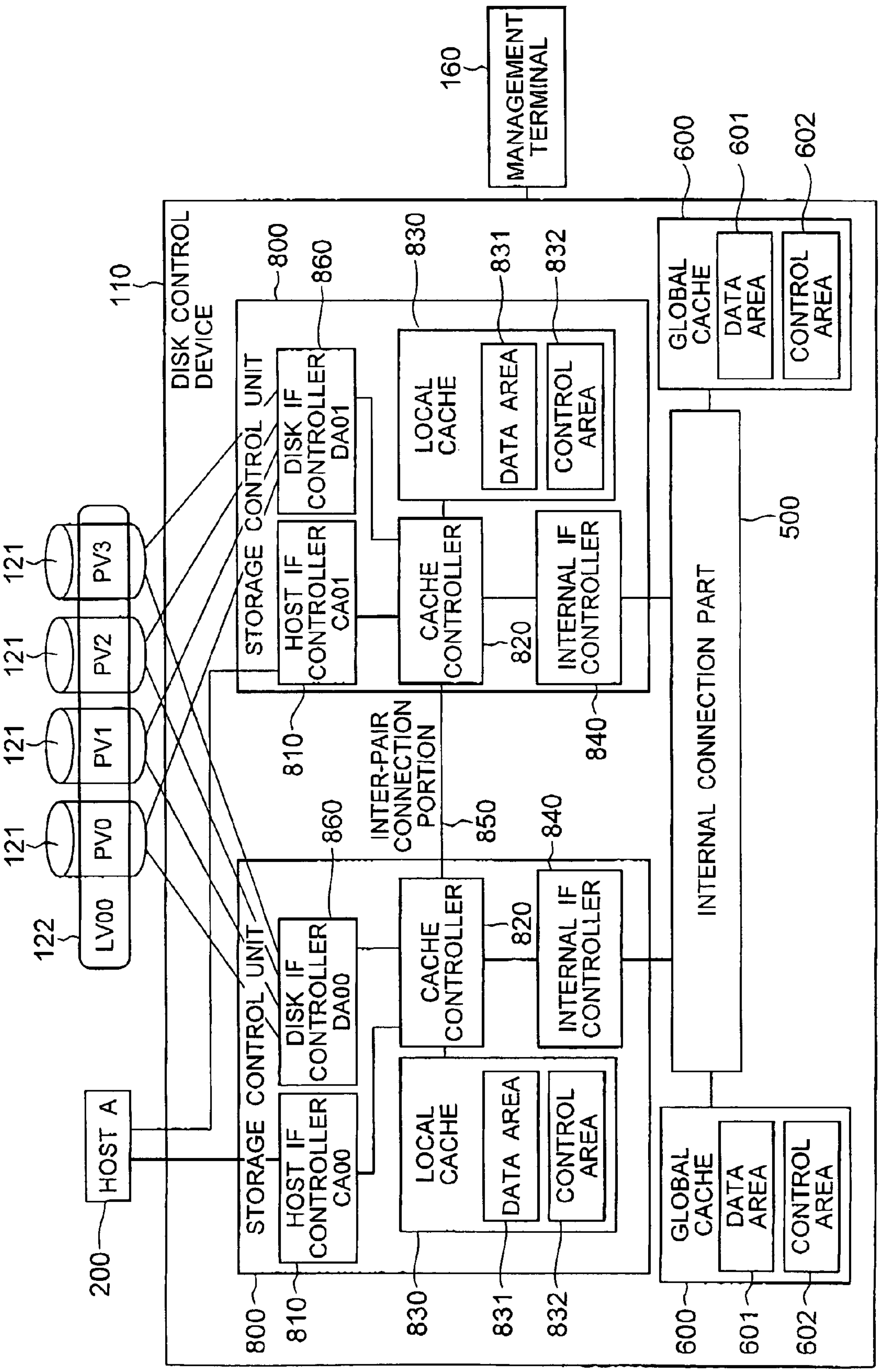
FIG. 20 is a block diagram showing an example of the storage system after scaled up according to the embodiment.

In the example of FIG. 18, the disk control device 110 initially introduced is composed of a pair of storage control units 800 that form a cluster, the internal connection part 500, and the management terminal 160. In the disk control device 110 shown in FIG. 18, the internal connection part 500 is used from the time of initial introduction, even though it is very expensive. This is because it is not just difficult to retrofit and maintain the internal connection part 500, it is virtually impossible to do so due to an extensive disassembly of the disk control device 110 that requires reassembly. Of course, as shown in FIG. 19, the initial storage system 100 can be provided without the internal connection part 500. In this case, however, if global caches are added, for example, the internal connection part 500 will also be added as shown in FIG. 20.

Figure 21:
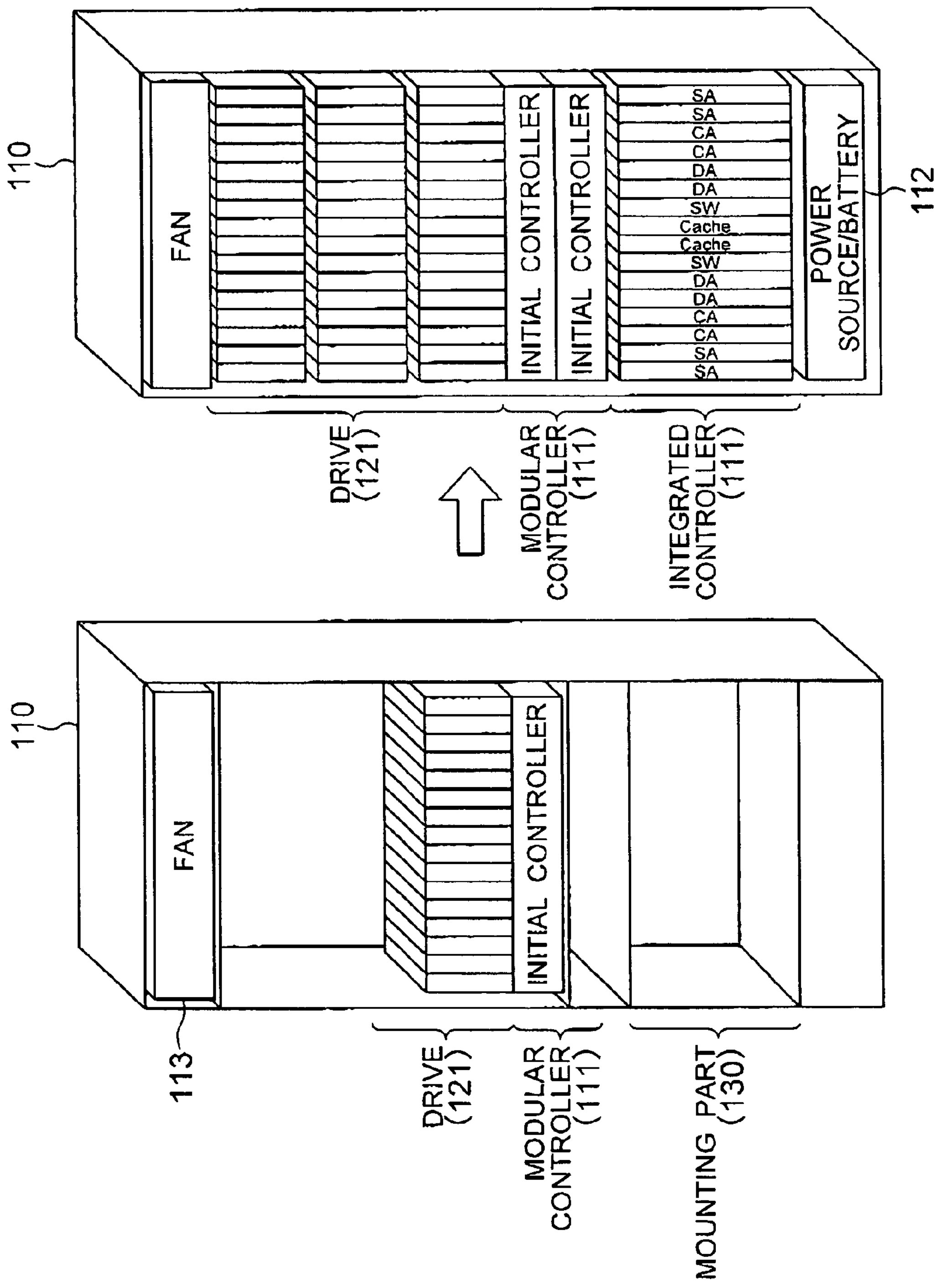
FIG. 21 is a perspective view showing an example of a change in the external appearance of the storage system upon scaling up according to the embodiment.
Figure 22:
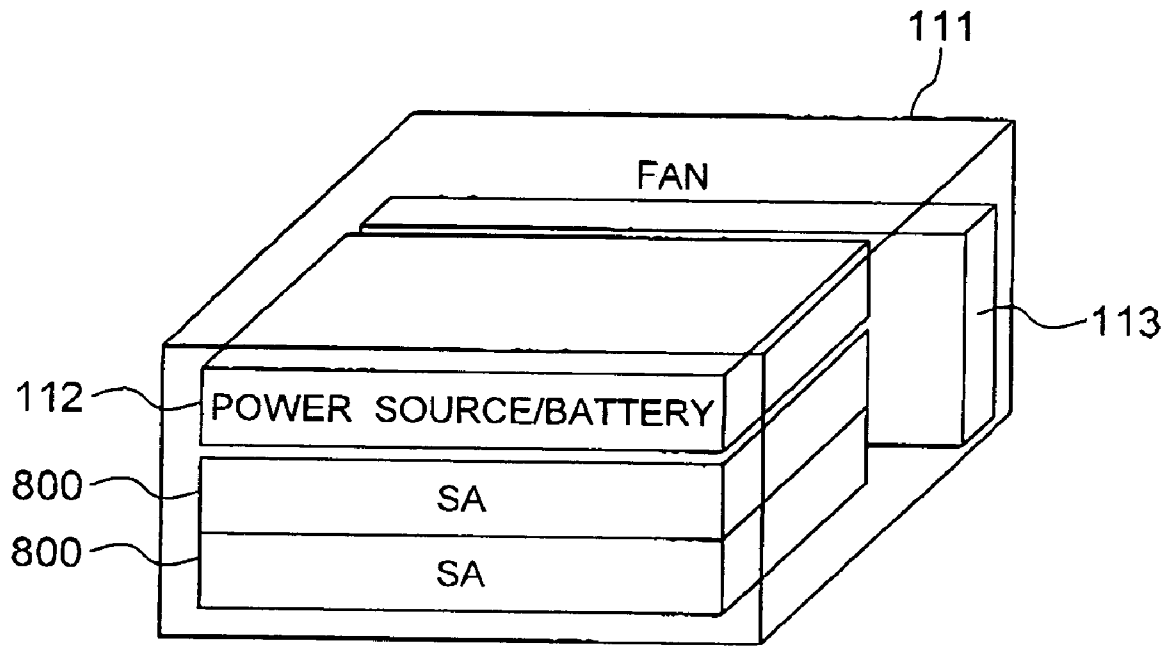
FIG. 22 is a perspective view showing an initial controller in the storage system according to the embodiment.
Figure 23:
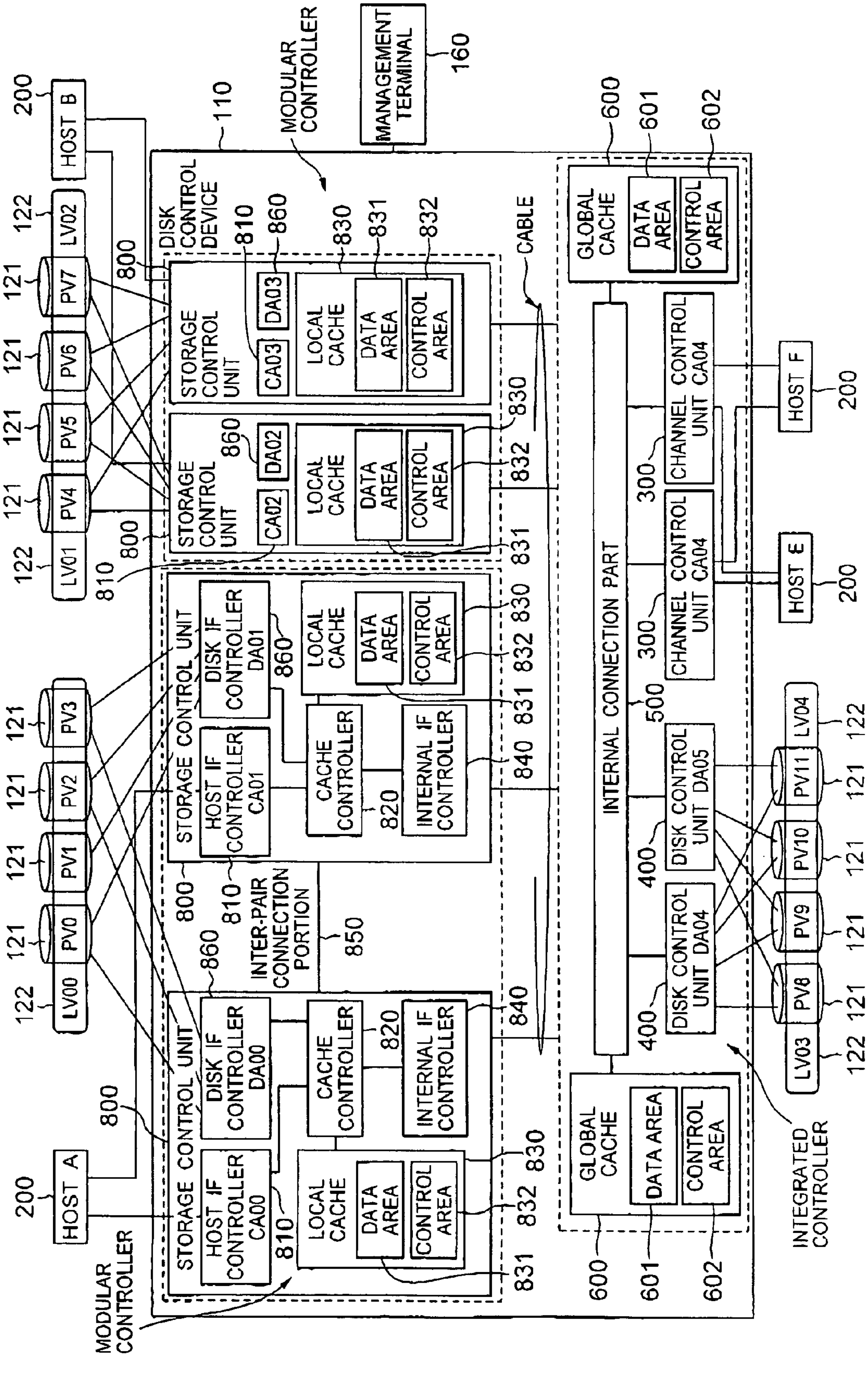
FIG. 23 is a block diagram showing an example of the storage system upon scaling up according to the embodiment.

Further, the concept of an initial controller 111 can be adopted to make the introduction of the storage system 100 easy. FIGS. 21 to 23 show what the initial controller 111 is like and how to introduce it in the storage system 100.

As shown in FIG. 21, at the time of initial introduction, the storage system 100 may begin operation with the initial controller 111 and a small number of disk drives 121. Then, some other storage control units 800 and/or disk control units 400 may be added to the mounting part 130 as the system scales up. As shown in FIG. 22, the initial controller 111 houses storage control units (SA) 800, the power source 112, and the fan 113 in a case. It is provided as a modular controller 111. Thus, the minimum preparation of the initial controller 111 and disk drives 121 that provide enough capacity for initial introduction allows the storage system 100 to begin operation.

FIG. 23 is a block diagram showing the structure of the storage system 100 using the initial controller 111 shown in FIGS. 21 and 22. As shown in FIG. 23, storage control units 800 are provided as the modular controller or initial controller 111. In this case, the storage system 100 does not need to include the expensive internal connection part 500 designed for the maximum size of the storage system 100. In other words, the integrated controller 111 does not need introducing, thereby realizing the storage system 100 at low cost. Further, the global caches 600 and the disk control units 400 are all provided as an integrated controller to be inserted in the mounting part 130. In this case, the internal connection part 500 and the initial controller 111 are connected through a cable.

Figure 24:
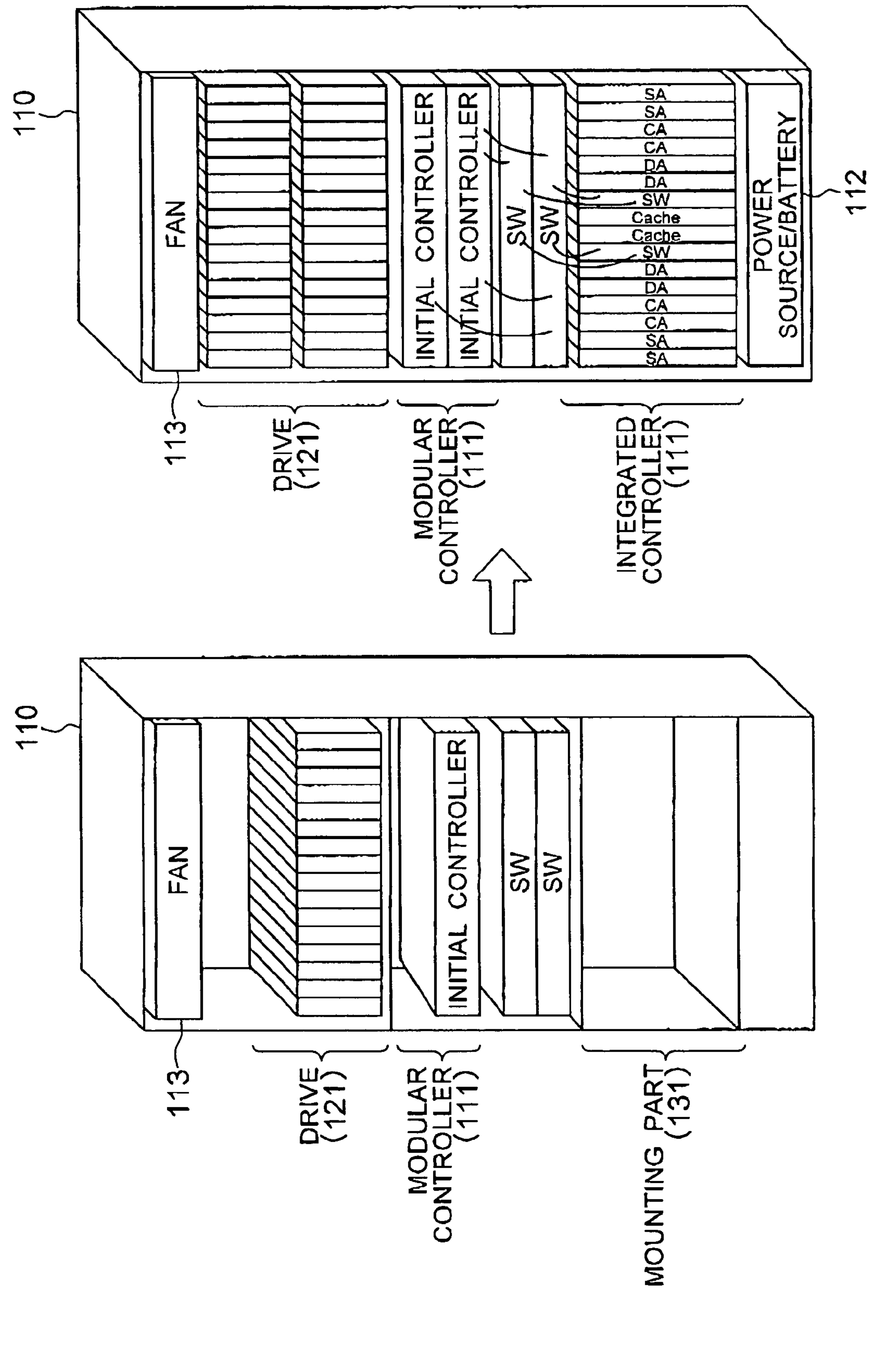
FIG. 24 is a perspective view showing an example of a change in the external appearance of the storage system upon scaling up according to the embodiment.
Figure 25:
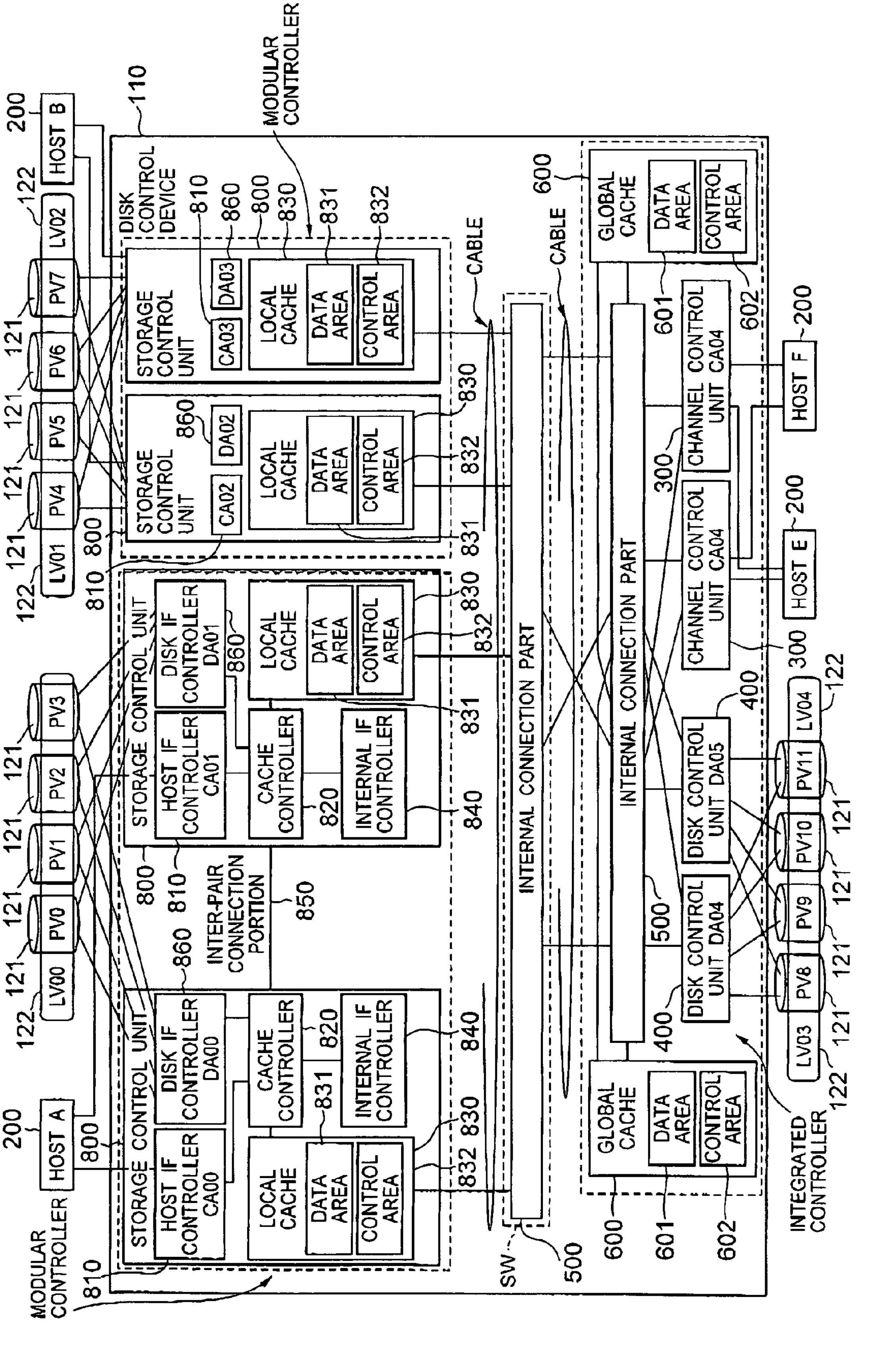
FIG. 25 is a block diagram showing an example of the storage system upon scaling up according to the embodiment.

Furthermore, as shown in FIG. 24, a modular SW (switch) may be mounted together with the initial controller 111 at the time of initial introduction of the storage system 100. The SW is a device for implementing the internal connection part 500. FIG. 25 is a block diagram showing the structure of the system in this case. As enclosed in dashed boxes in FIG. 25, the internal connection part 500 is implemented in a combination of the mounted modular SW and the SW added when the integrated controller 111 has been introduced. In this case, cables are connected between the SWs, and the SW and the storage control units 800.

<<Flow of Data I/O Processing>>

The following describes the flow of data I/O processing performed when the storage system 100 according to the embodiment receives data I/O requests from the host computer 200. It should be noted that the data I/O processing according to the embodiment is performed by the control programs 813, 836, 313, and 463 executed by the processors 811, 861, 311, and 461, respectively.

Figure 26:
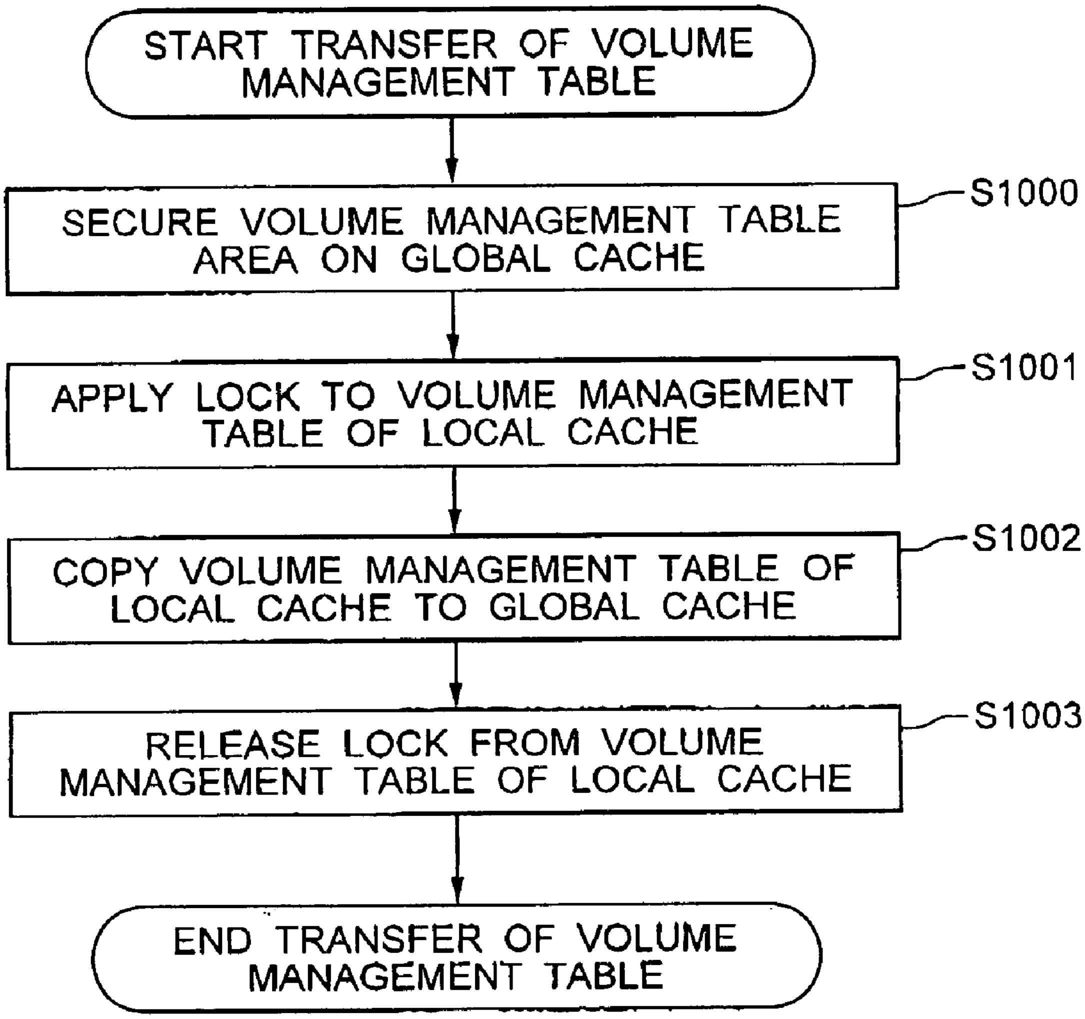
FIG. 26 is a flowchart showing processing for transferring a volume management table from the local cache memory to the global cache memory in the storage system according to the embodiment.

First of all, referring to FIG. 26, a description will be made of the flow of how to transfer the volume cache tables 835 and 335 of the local caches 830 and 330 of the storage control unit 800 and the channel control unit 300 to the global cache 600. This processing is performed by the processors 811 and 311 of the storage control unit 800 and the channel control unit 300 in accordance with instructions from the management terminal 160.

At first, an area for creating the volume management table 605 is secured in the global cache 600 (S1000). Next, locks are applied to the volume management tables 835 and 335 of the local caches 830 and 330 (S1001). Then duplicates of the volume management tables 835 and 335 are made and written into the global cache 600 (S1002). Upon completion of the writing process, the locks to the volume management tables 835 and 335 are released, and the processing is ended (S1003). The area secured in step S1000 has to be larger than the total size of the volume management tables 835 and 335. Further, a lock may be applied on a copy basis.

Here, for example, assuming that a storage control unit 800 has received a data I/O request from the host computer 200. Suppose further that the storage control unit 800 consulted its own local cache 830 but was not be able to identify a storage volume to which the data I/O request is directed. In such a case, the storage control unit 800 can consult the volume management table 605 of the global cache 600 to identify a unit to perform I/O control to the storage volume concerned.

Figure 27:
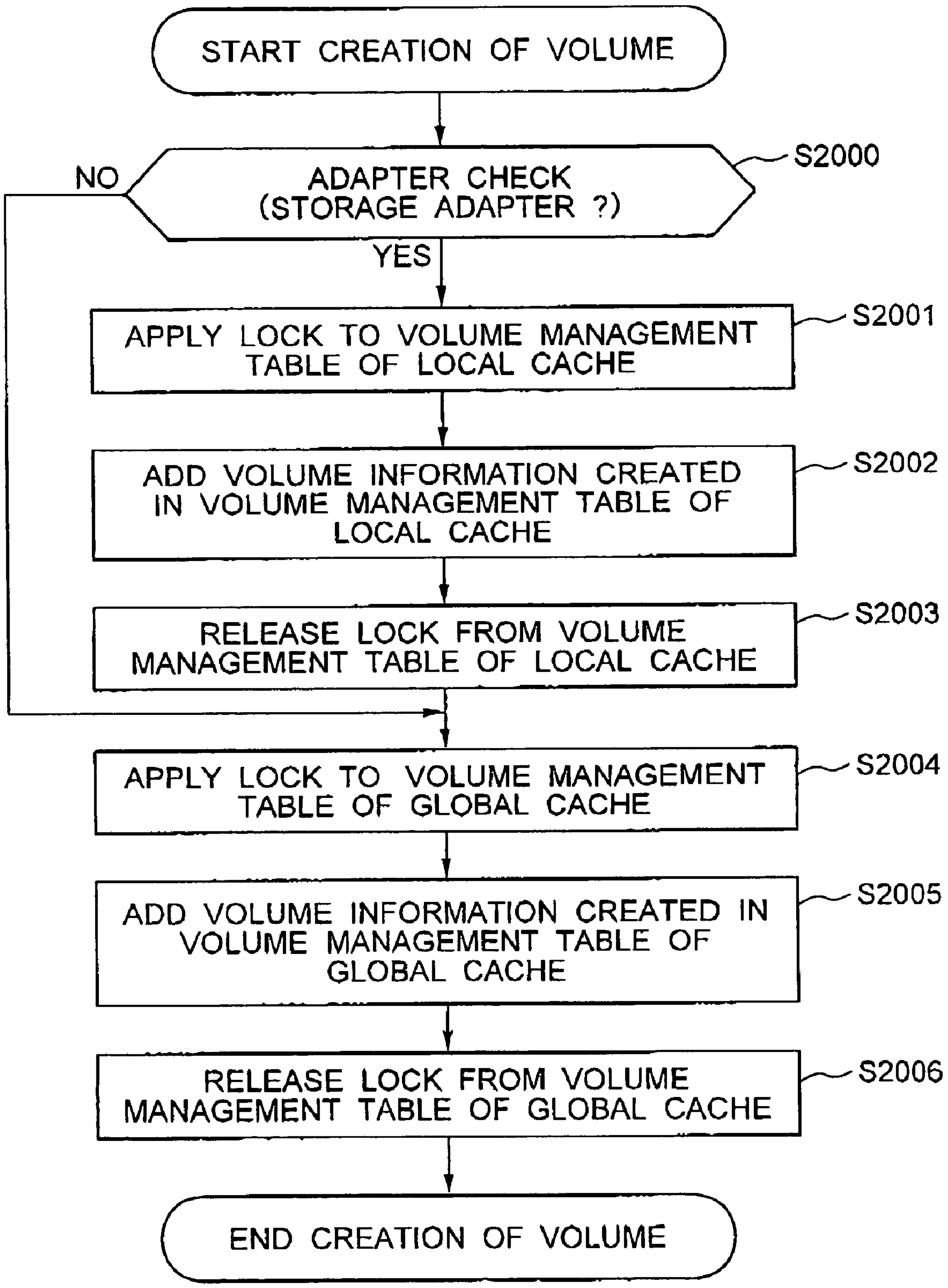
FIG. 27 is a flowchart showing processing for updating the volume management table when a new volume is created in the storage system according to the embodiment.

Referring next to FIG. 27, a description will be made of processing for updating the volume management tables 835 and 335 upon configuring a new storage volume.

It is first determined whether the unit to perform I/O control to the newly configured storage volume is a storage control unit 800 (S2000). If it is the storage control unit 800, a lock is applied to the volume management table 835 of the local cache 830 (S2001). Then information relating to the newly added storage volume is written into the volume management table 835 (S2002). Upon completion of the writing process, the lock to the volume management table 835 of the local cache 830 is released (S2003). Subsequently, the same writing is performed on the volume management table 605 of the global cache 600, and the processing is ended (S2004 to S2006). When it is determined in step 32000 that the target unit is not the storage control unit 800, only the volume management table 605 of the global cache 600 is processed.

Figure 28:
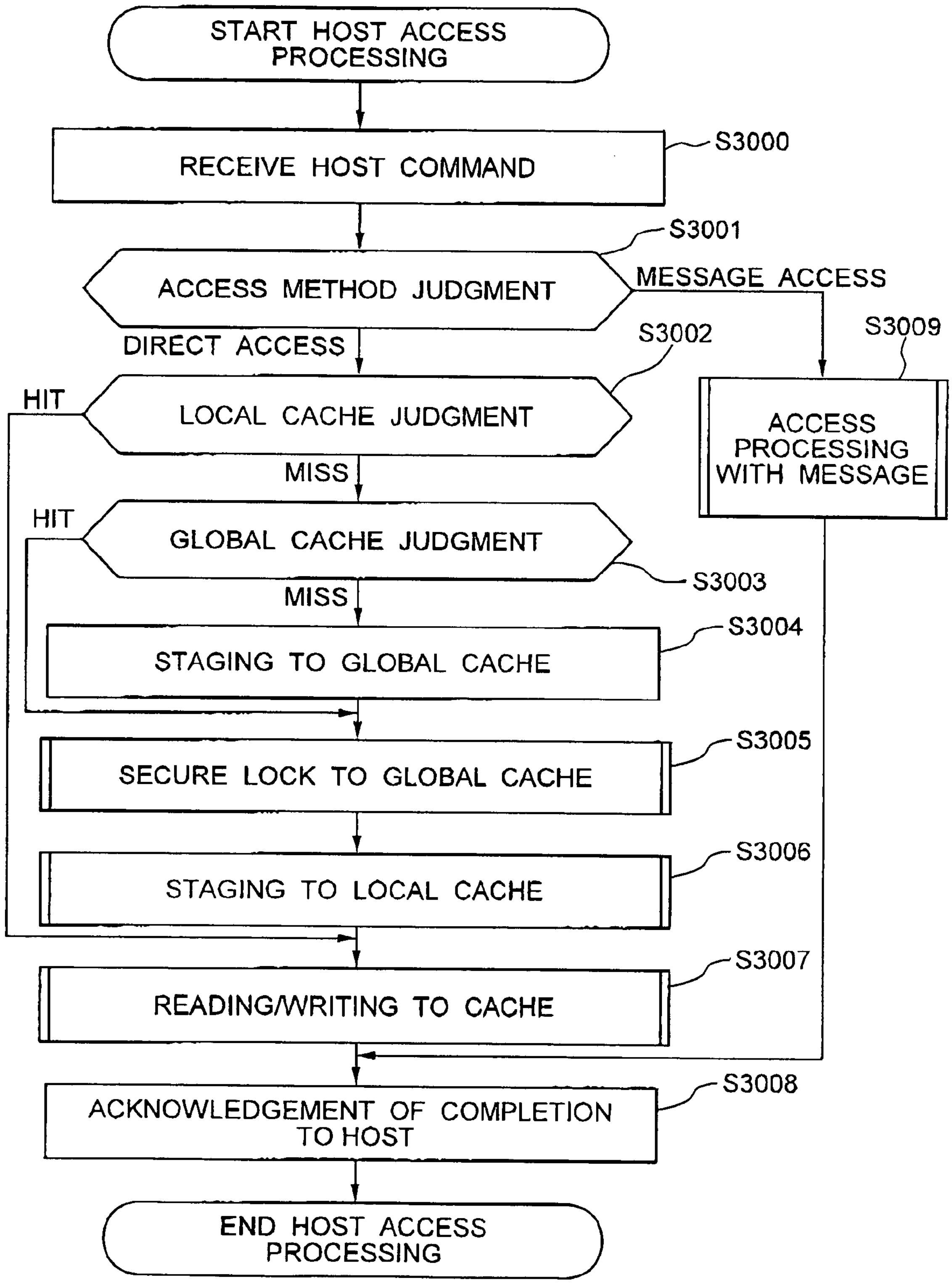
FIG. 28 is a flowchart showing data access processing according to the embodiment.

FIG. 28 is a flowchart showing the flow of operations when a data access request is made from the host computer 200 to the storage system 100 according to the embodiment.

Upon receipt of a data access request from the host computer 200 to the storage control unit 800 or The channel control unit 300 (S3000), the processor 811 or 311 of the host IF controller 810 or 310 analyzes the access request, and based on the analysis results, it determines the type of access (read request or write request) and the address of data to be accessed.

Figures 36, 37:
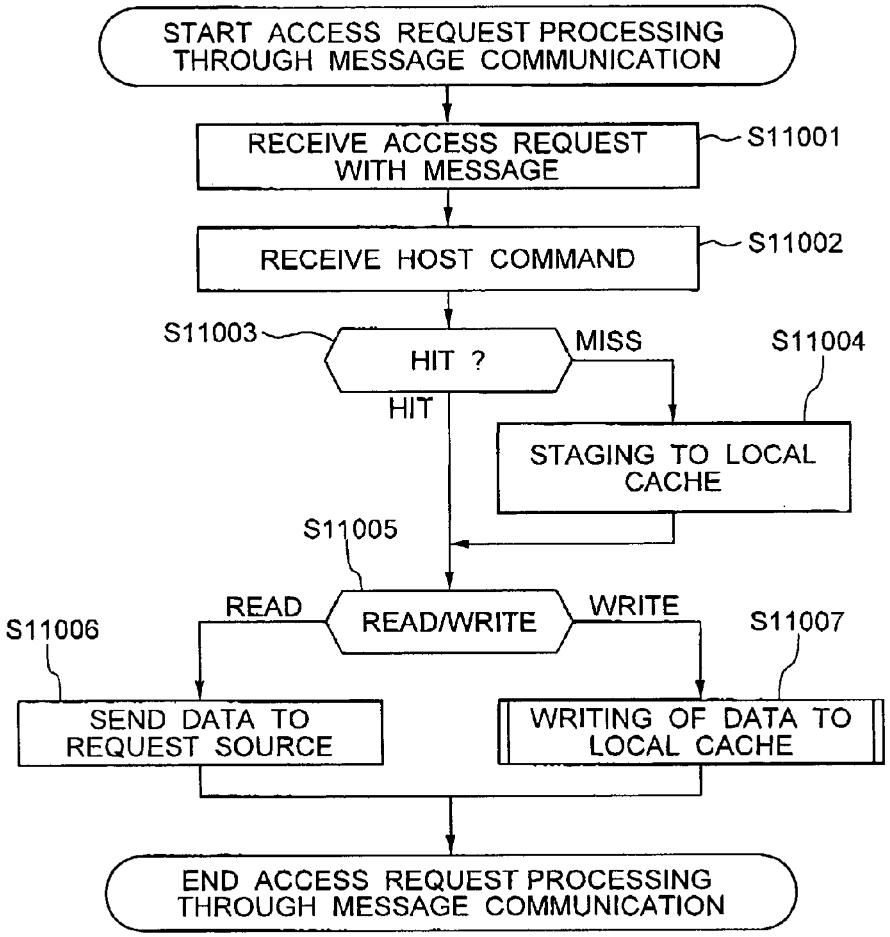
FIG. 36 is a flowchart showing data access processing performed on the message receiving side according to the embodiment.
FIG. 37 shows the structure of a command according to the embodiment.

Then the processor 811 or 311 sends a command as shown in FIG. 38 to the cache controller IF circuit 821 or 321 of the cache controller 820 or 320 according to the type of access. In the event of a read request, a command shown at D in FIG. 38 is sent, while in the event of a write request, a command shown at A in FIG. 38 and a command (data) shown at B in FIG. 38 are sent. FIG. 37 shows the format of commands of FIG. 38. As shown in FIG. 37, each of the commands of FIG. 38 consists of a header part and a payload part. The header part consists of the transfer destination address, transfer source address, transfer length, and packet type. As shown in FIG. 38, the packet type includes Write, Read, Data, and Status Information.

The cache controller IF circuit 821 or 321 consults the volume management table 835 stored in the control area 832 or 332 of the local cache 830 or 330 according to the command sent from the processor 811 or 311 to identify a storage volume to which the data I/O request is directed. Then it consults the "AccessMethod" column of the volume management table 835 to identify a data access method to the unit concerned (S3001). If "direct" is listed, the procedure goes to step S3002.

In step S3002, the cache controller IF circuit 821 or 321 searches the cache data management table 834 or 334 stored in the control area 832 or 332 of the local cache 830 or 330 according to the command sent from the processor 811 or 311 to confirm whether data at the address specified by the command is stored in the local cache 830 or 330 (S3002).

When the data exists (is hit) in the local cache 830 or 330 (S3002), the reading or writing of data is performed on the local cache 830 or 330 (S3007), and an acknowledgement of completion is sent to the host computer 200 (S3008).

Figure 29:
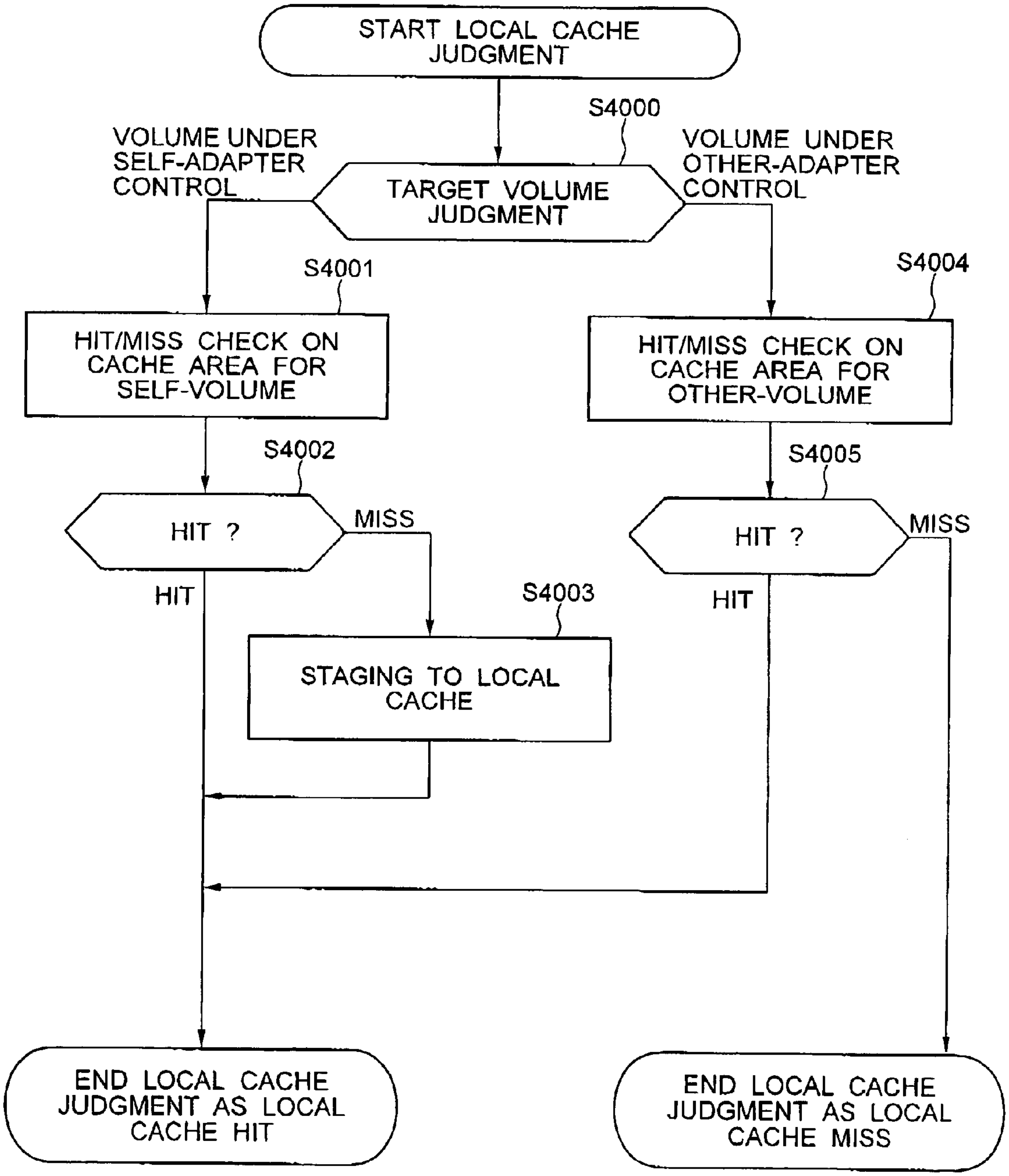
FIG. 29 is a flowchart showing processing for performing a hit/miss check on the local cache according to the embodiment.

FIG. 29 shows processing performed in step S3002. At first, it is determined in step S4000 which unit is to perform I/O control to the storage volume to which the data I/O request from the host computer 200 is directed (S4000). If the data I/O request is directed to a storage volume under the control of its own unit, a hit/miss check is performed on the self-directed SAVOL area (first storage area) (S4001). Then, if a miss is found, staging of the data from the global cache 600 or the storage volume is performed (S4002 and S4003). The term "staging" means reading of data from a lower memory layer. On the other hand, if it is determined in step S4000 that the data I/O request is directed to a storage volume under the control of any other unit, a hit/miss check is performed on the other-directed DAVOL area (second storage area) (S4004). Then, if a miss is found, staging of the data from the global cache 600 or the storage volume is performed (S4005 and S3003).

Figure 33:
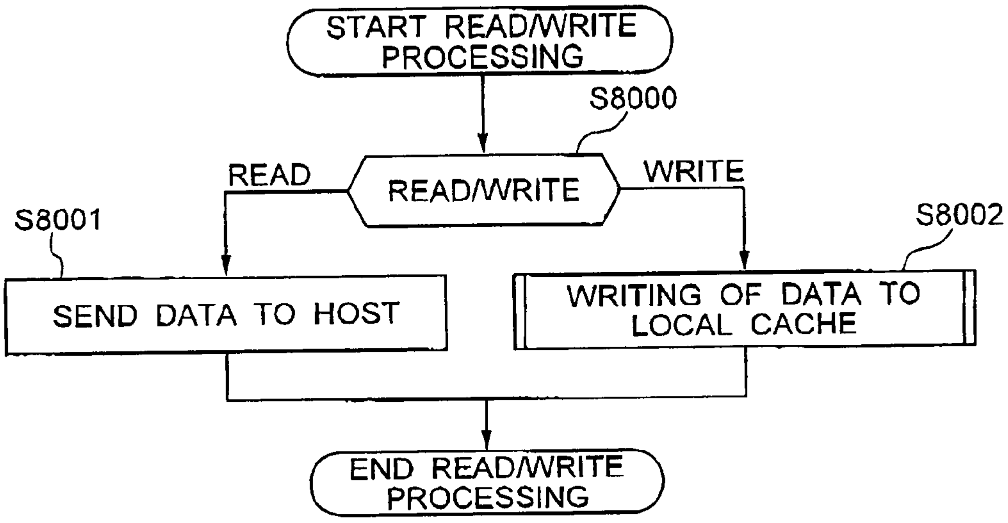
FIG. 33 is a flowchart showing read/write processing according to the embodiment.

Referring next to FIG. 33, the flow of read/write processing performed in step S3007 for the local cache 830 or 330.

Figure 40:
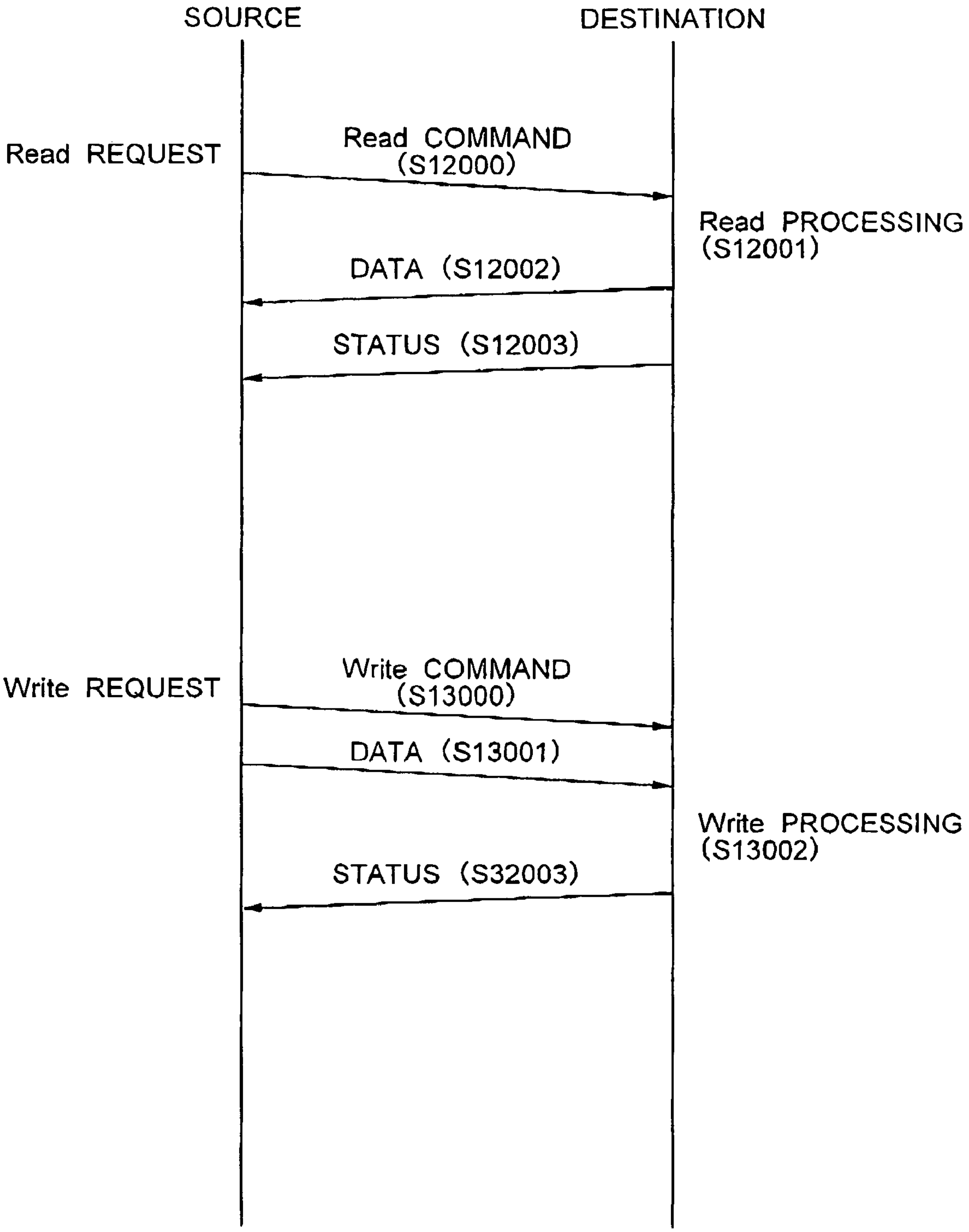
FIG. 40 shows the sending and receiving of commands according to the embodiment.

When the access request from the host computer 200 is a read request, the cache controller IF circuit 821 or 321 reads the data out of the local cache 830 or 330 and sends the same to the host computer 200 (S8000 and S8001). Upon receipt of an acknowledgement (ACK) of completion of the reading process from the local cache 830 or 330, the cache controller IF circuit 821 or 321 sends a status to the processor 811 or 311. The status sent to the processor is a command shown at F in FIG. 38. Finally, the processor 811 or 311 sends an ACK of completion of the reading process to the host computer 200 (S3008), and ends the processing. A chart of FIG. 40 shows the above-mentioned read-request processing.

Figure 34:
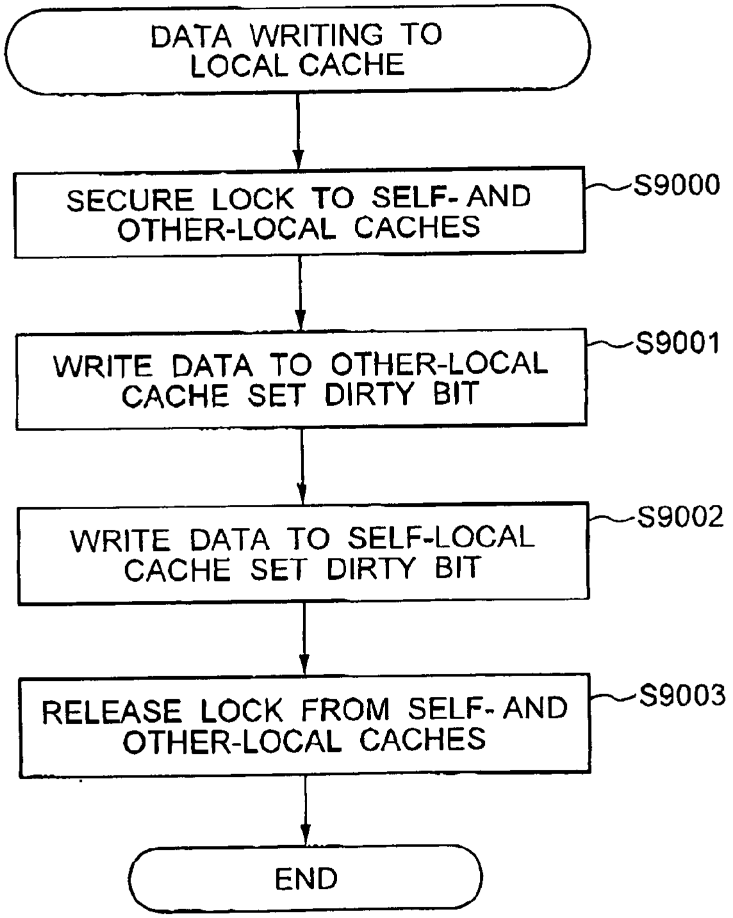
FIG. 34 is a flowchart showing write processing to the local cache memory according to the embodiment.

On the other hand, when the access request from the host computer 200 is a write access, the cache controller IF circuit 821 or 321 writes to the local cache 830 or 330 write data sent from the host computer 200 and stored in the buffer memory 822 or 322 (S8002). FIG. 34 shows the details of the writing of data to the local cache 830 or 330. At first, the cache controller IF circuit 821 or 321 sends a request to another cache controller IF circuit 821 or 321 with which the cache controller IF circuit 821 or 321 pairs up to apply a lock to the local cache 830 or 330. Upon receipt of an acknowledgement that the lock has been secured, that is, when securing the locks to both of self/other local caches 830 or 330 (S9000), the cache controller IF circuit 821 or 321 sends write data stored in the buffer memory 822 or 322 to the other buffer memory 822 or 322 through the inter-pair connection portion 850 or 350. The writing of the data to the other local cache 830 or 330 is performed by the other cache controller IF circuit 821 or 321 (S9001). After that, the cache controller IF circuit 821 or 321 performs self-directed writing to its own local cache 830 or 330 (S9002). When writing data to the local cache 830 or 330, it places a checkmark in the "Dirty" column of the cache data management table 834 or 334. Upon completion of writing data to both of the local caches 830 or 330, the locks are released. After that, the cache controller IF circuit 821 or 321 sends an acknowledgement of completion to the host computer 200, and ends the processing (S9003). A chart of FIG. 40 shows the above-mentioned write-request processing.

In the embodiment, although searches of the cache data management table 834 or 334 of the local cache 830 or 330 and reading of data from the local cache 830 or 330 are controlled by the cache controller IF circuit 821 or 321, the processor 811 or 311 may control such operations instead.

Further, as will be described in detail, data access control to the global cache 600 may also be controlled by the processor 811 or 311 instead of the cache controller IF circuit 821 or 321.

Next, a description will be made on a case where the cache controller IF circuit 821 or 321 has received a data I/O request from the host computer 200, but there is no corresponding data in the cache 830 or 330, that is, where a cache miss is found.

In this case, it is confirmed whether there is corresponding data in the global cache 600 (S3003). At first, the cache controller IF circuit 821 or 321 sends a command to the global cache 600 through the internal connection part 500 based on the address of the data specified by a command sent from the processor 811 or 311. Then it searches the cache data management table 604 recorded in the control area 602 of the global cache 600 to confirm whether the data is stored in the global cache 600.

If there is no corresponding data in the global cache 600, the volume management table 605 is consulted to send a command to a unit to perform I/O control to the storage volume to which the data I/O request is directed. Then the data is read out of the storage volume and stored in the global cache 600 (S3004). The data stored in the global cache 600 is also sent to another global cache 600 with which the global cache 600 pairs up, thus duplicating the data.

Here, priority may be given to processing for delivering to the host computer 200 the data read from the storage volume to the global cache 600 ahead of others, while giving lower priority to duplication of the data on the global caches 600. Since the data on the global caches 600 is also stored in the storage volume, no problem would occur even in the event of loss of the data on the global caches 600. The data can be duplicated to ensure the reliability of the data.

Figure 30:
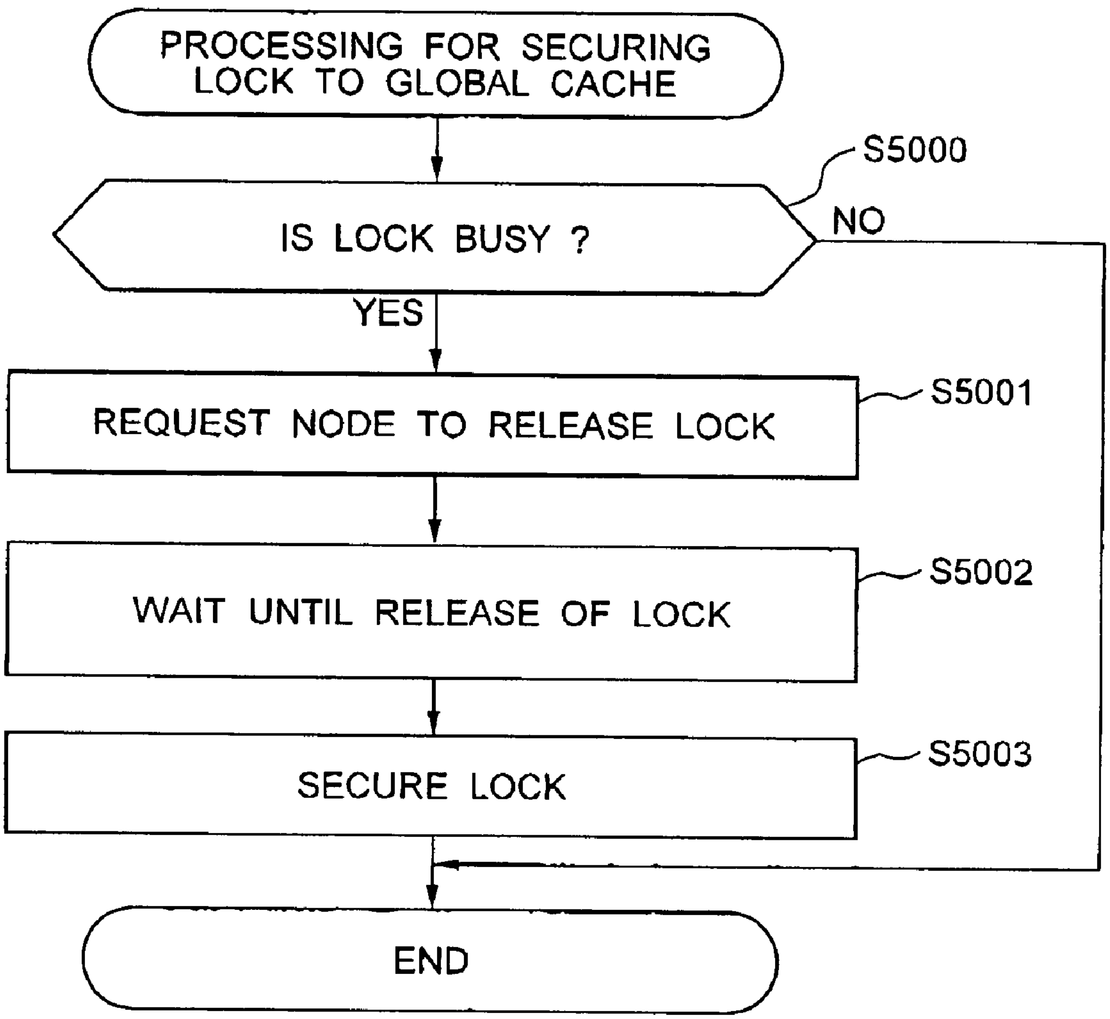
FIG. 30 is a flowchart showing processing for securing a lock to the global cache according to the embodiment.

Following the processing in step S3004, a lock is applied to the data on the global cache 600 (S3005). In other words, the data on the global cache 600 is protected from being read by any other local cache 830 or 330. A flowchart of FIG. 30 shows this processing.

When the data has already been read in any other local cache 830 or 330 and a lock has been applied to the data (S5000), the local cache 830 or 330 is required to release the lock (S5001). In this case, the "Owner" column of the cache data management table 604 can be consulted to know to which local cache 830 or 330 the lock has been applied. After waiting until the lock is released (S5002), a lock is applied to the data on the global cache 600 to protect it from being read by any other local cache 830 or 330 (S5003). After that, the processing is ended. If no lock is applied to all of the local caches 830 and 330, the lock is applied to the data on the global cache 600 immediately, and the processing is ended (S5000 and S5003).

Figure 31:
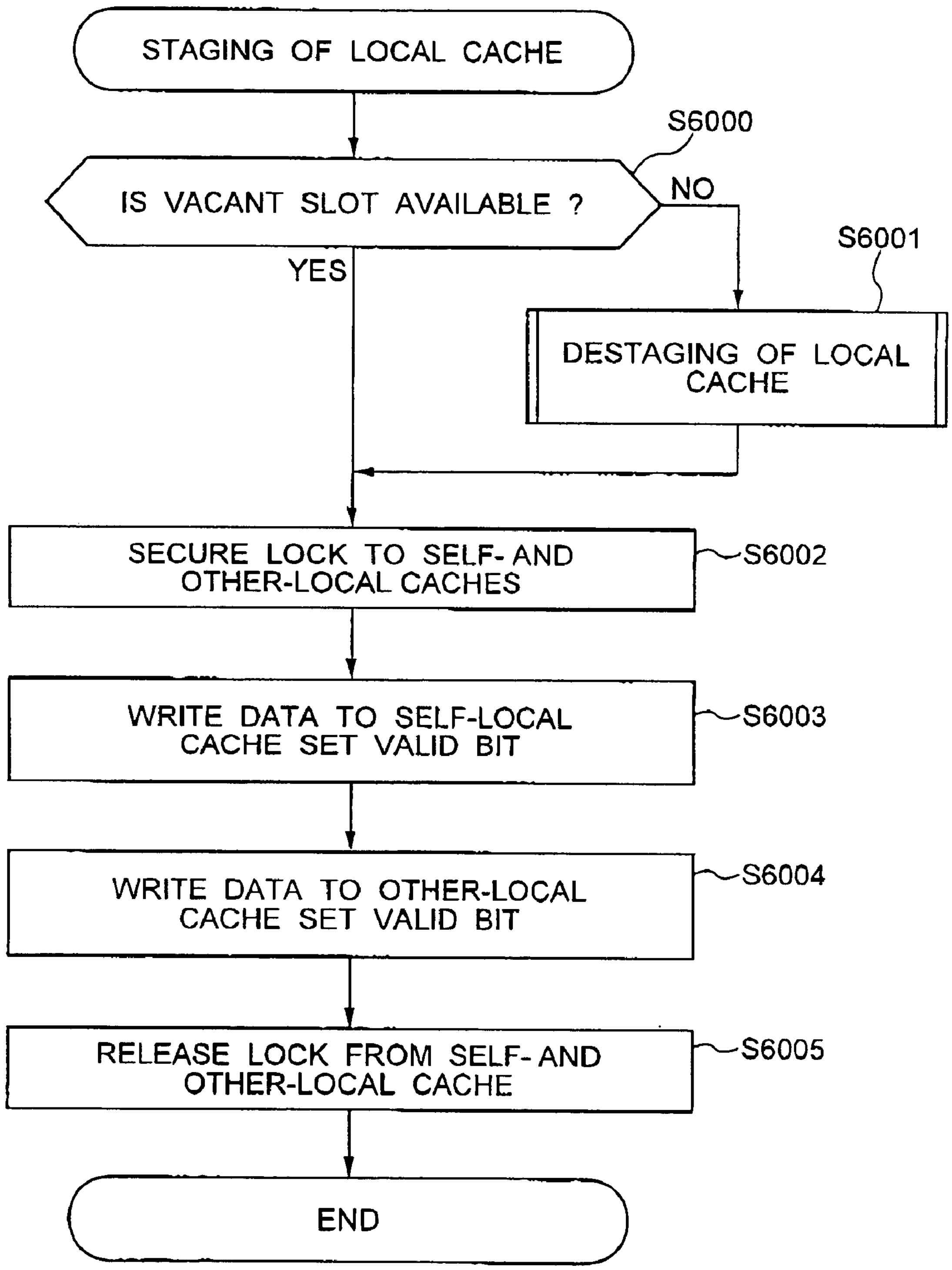
FIG. 31 is a flowchart showing processing for performing staging of the local cache memory according to the embodiment.

After that, the data on the global cache 600 is read into a local cache 830 or 330 (S3006). A flowchart of FIG. 31 shows the flow of this processing.

At first, before the data is transferred from the global cache 600 to the local cache 830 or 330, it is checked whether there is a vacant slot in the queue for writing the data on the local cache 830 or 330 (S6000). The term "slot" means each storage area of the queue. In this processing step, it may be checked whether there is a vacant area for writing the data on the local cache 830 or 330. In this case, the Valid" column of the cache data table 834 or 334 is searched to check whether the total amount of invalid data is larger than that of data to be transferred from the global cache 600.

If there is a vacant slot, the cache controller IF circuit 821 or 321 sends a request to another cache controller IF circuit 821 or 321 with which the cache controller IF circuit 821 or 321 pairs up to apply a lock to the local cache 830 or 330 (S6002). Then, the cache controller IF circuit 821 or 321 stores, in the buffer memory 822 or 322, the data from the global cache 600, and sends the data to the buffer memory 822 or 322 of the other cache controller IF circuit 821 or 321. The cache controller IF circuit 821 or 321 also writes the data into its own local cache 830 or 330 (S6003 and S6004). After completion of the writing of the data on each other's local caches 830 or 330, the lock is released and the processing is ended (S6005). The operations that follow this processing are carried out in the manner mentioned above in response to data I/O requests from the host computer 200 (S3007 and S3008).

Figure 32:
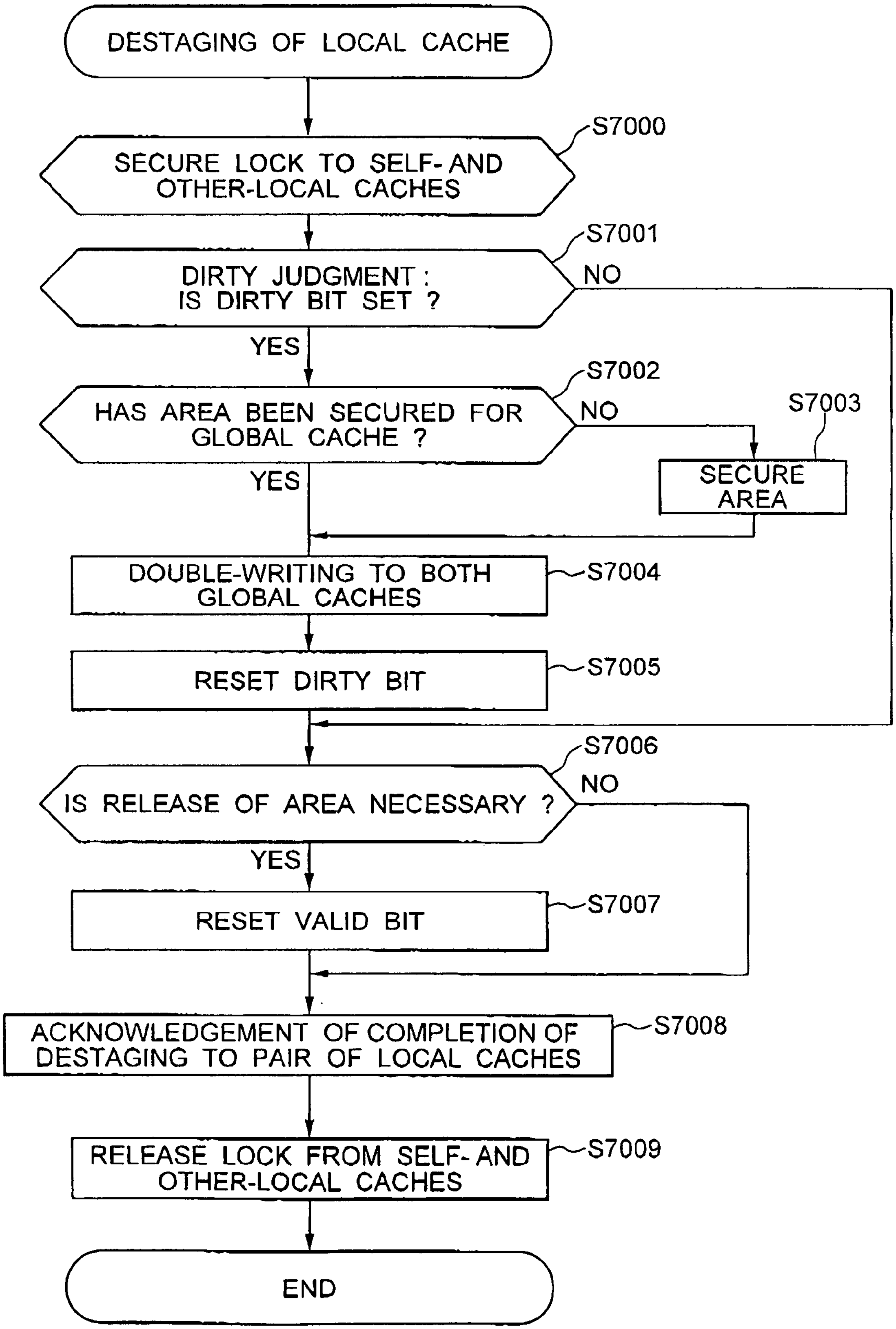
FIG. 32 is a flowchart showing processing for performing destaging of the local cache memory according to the embodiment.

If there is no vacant slot for transferring the data from the global cache 600 to the local cache 830 or 330, any of data on the local cache 830 or 330 needs to be written back to the global cache 600 to secure a vacant slot (S6001). A flowchart of FIG. 32 shows this processing.

At first, the cache controller IF circuit 821 or 321 sends a request to another cache controller IF circuit 821 or 321 with which the cache controller IF circuit 821 or 321 pairs up to apply a lock to the local cache 830 or 330 (S7000). Then, the cache data management table 834 or 334 is searched for a Dirty bit of the data to be written to the global cache 600 specified according to a predetermined algorithm (S7001). As the predetermined algorithm, the LRU (Least Recently Used) method is commonly used, but any other algorithm may also be adopted.

If no Dirty bit is set, the data does not need to be written back to the global cache 600. On the other hand, if a Dirty bit is set, since the data needs to be written to the global cache 600, it is checked whether or not there is a vacant slot for writing the data to the global cache 600 (S7002). If there is no vacant slot on the global cache 600, any of data on the global cache 600 is written to a storage volume to secure a vacant slot (S7003).

Then the data is written from the local cache 830 or 330 to the vacant slot on the global cache 600 (S7004). The writing is performed on two global caches 600. After completion of the writing of the data to the global caches 600, since the data is no long "Dirty," the Dirty bit is reset (S7005). If a slot on the local cache 830 or 330 needs releasing (S7006), the "Valid" bit of the data is reset (S7007).

Then, the cache controller IF circuit 821 or 321 sends an acknowledgement of completion of the writing of the data to the global caches 600 to another cache controller IF circuit 821 or 321 with which the cache controller IF circuit 821 or 321 pairs up (S7008). Upon receipt of this acknowledgement, the other cache controller IF circuit 821 or 321 resets the "Valid" bit in the cache data management table 834 or 334. Finally, the lock to the local cache 830 or 330 is released (S7009), and the processing ended.

Figure 35:
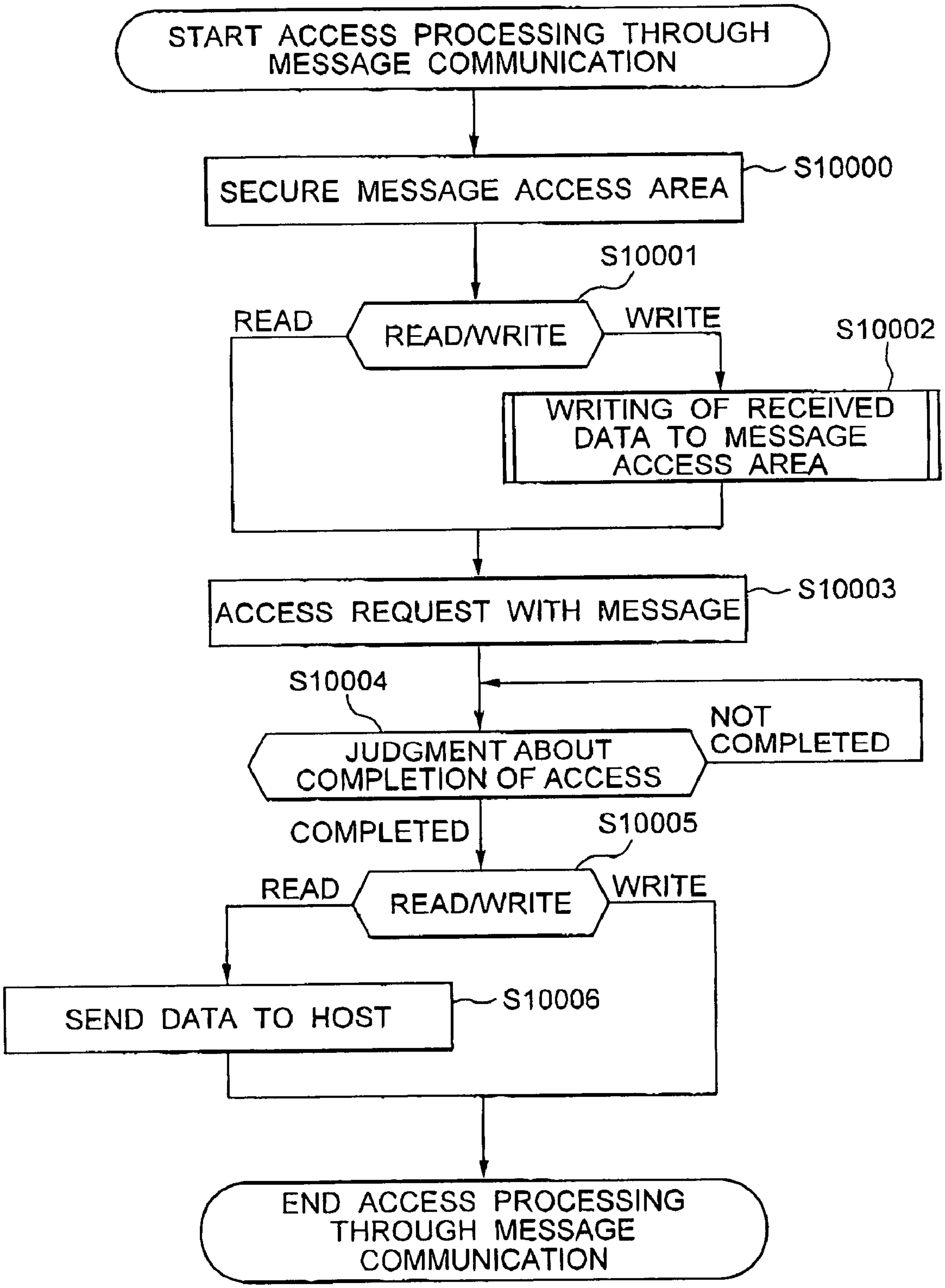
FIG. 35 is a flowchart showing data access processing performed on the message sending side according to the embodiment.

On the other hand, if it is determined in step S3001 that "message" is listed in the AccessMethod" column of the volume management table 825 or 325, the procedure goes to step S3009. FIG. 35 shows the flow of the processing step S3009.

At first, the cache controller IF circuit 821 or 321 secures an area (communication buffer) for message access (S10000), In other words, it secures a vacant area in the communication buffer 837 of the local cache 830 or 330 of the unit to perform I/o control to the storage volume to which the data I/O request is directed.

If the data I/O request from the host computer 200 is a read request, the data I/O request is written into the communication buffer 837 in which the above-mentioned area has been secured (S10001 and S10003). The writing of the data I/O request is performed by a message shown in FIG. 39. As shown at A in FIG. 39, the message is a message command. The data I/O request is inserted into a message data field of the message shown at B in FIG. 39, and written into the communication buffer 837. When receiving a notification of completion of the data I/O control and the read-out data (S10004), the cache controller IF circuit 821 or 321 sends the data to the host computer 200 (S10006).

On the other hand, if the data I/O request from the host computer 200 is a write request, the cache controller IF circuit 821 or 321 writes the data I/O request and write data into the communication buffer 837 in which the above-mentioned area has been secured (S10001 through S10003). Then, the notification of completion of the data I/O control is written into the communication buffer 837 (S10004), and sent to the host computer 200. After that, the processing is ended.

FIG. 36 shows processing performed by a storage control unit 800 when a message is written into its own communication buffer 837.

At first, when detecting that a message has been written into its own communication buffer 837 (S11001), the cache controller IF circuit 821 or 321 reads the data I/O request from the communication buffer 837 (S11002). Then it checks whether data to which the data I/O request is directed is stored in the local cache 830 (S11003). If a miss-hit is found, the data is read out of the global cache 600 or the storage volume, and stored in the local cache 830 (S11004). Then, if the data I/O request is a read request, the read-out data is written into the communication buffer 837 of the message source (S11006). On the other hand, if the data I/O request is a write request, write data is written into the local cache 830 according to the data I/O request (S11007). This writing process is performed in the same manner shown in FIG. 34. Then, the notification of completion of the writing process is written into the communication buffer 837 of the other side.

Figure 41:
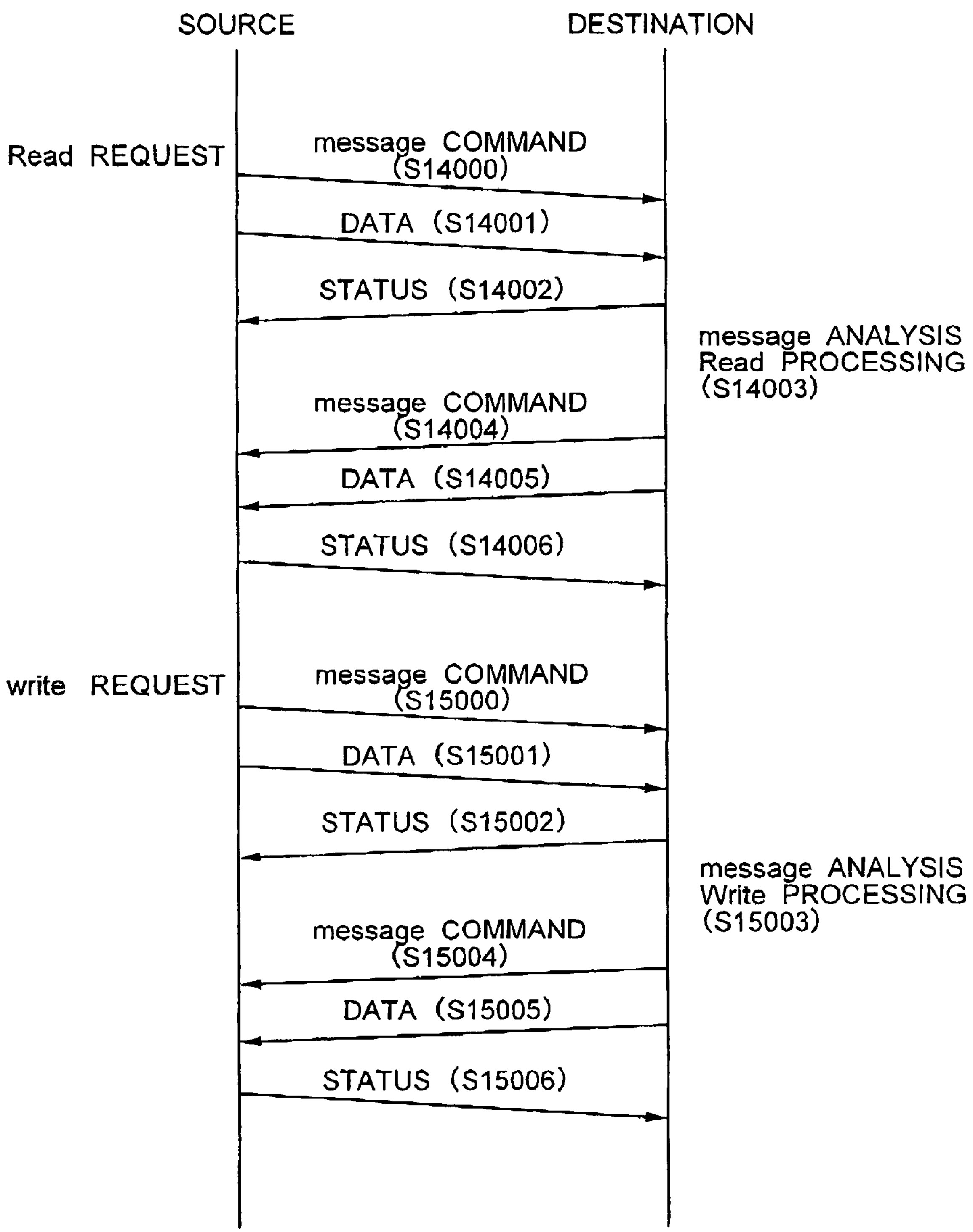
FIG. 41 shows the sending and receiving of messages according to the embodiment.

FIG. 41 shows the flow of exchanging messages between storage control units 800 through their communication buffers 837.

Exchanging data I/O requests through communication buffers 837 allows each storage control unit 800 to perform data I/O control to storage volumes connected to another storage control unit 800 independently of processing by another storage control unit 800.

Figure 42:
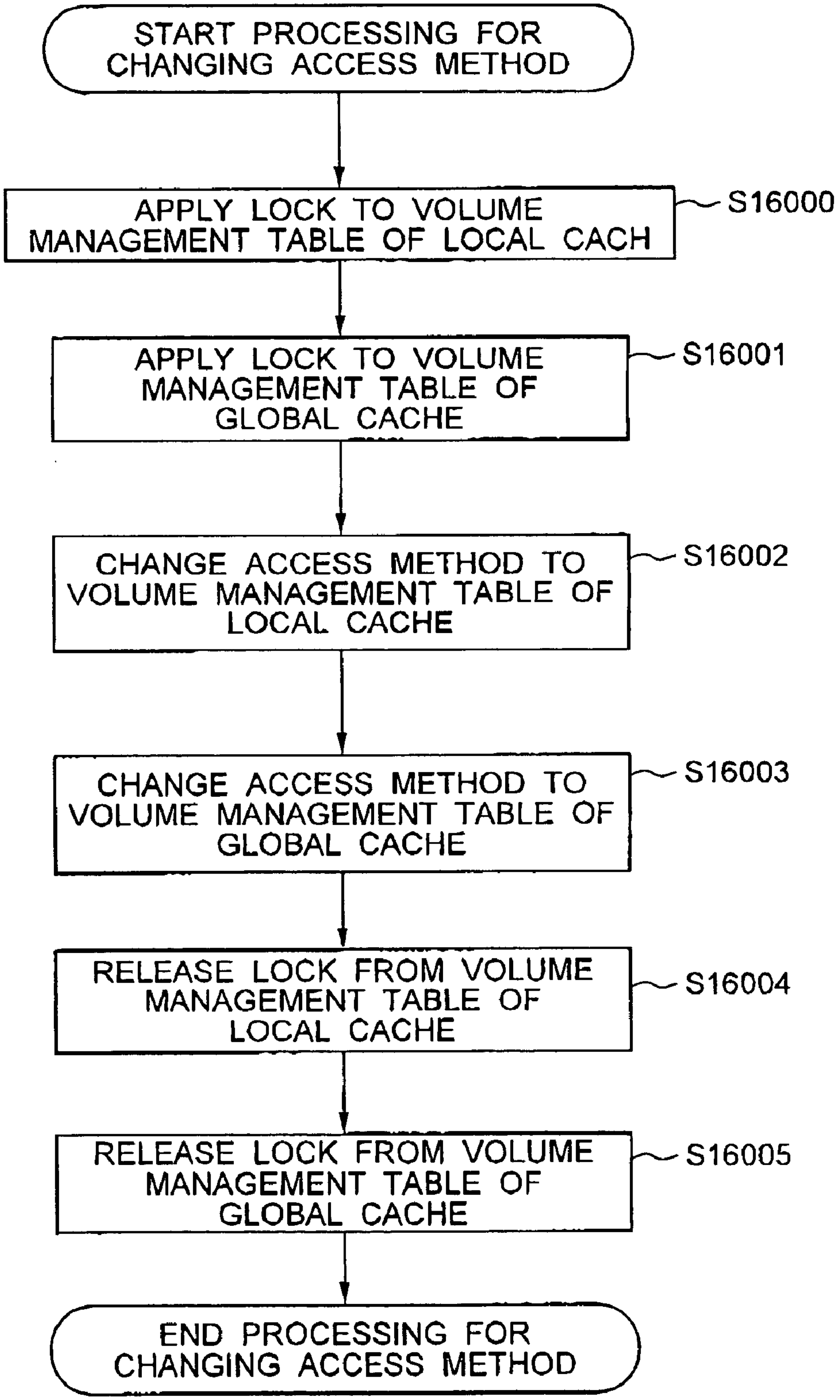
FIG. 42 is a flowchart showing processing upon changing an access method according to the embodiment.

In the storage system 100 operated with only the storage control units 800 at the time of initial introduction, disk control units 400 may be added. Referring next to FIG. 42, processing for changing storage volumes are added will be described when the disk control units.

In this processing, data stored in the storage volumes connected to the storage control units 800 are duplicated and written into storage volumes connected to the disk control units 400, so that data I/O control to the next and later data I/O requests from the host computer 200 is performed on the storage volumes connected to the disk control units 400. This processing makes it possible to improve flexibility in changing the structure of the storage system 100. For example, a customer who started the operation of the storage system 100 with the initial controller 111 at the time of initial introduction can scale up the storage system 100 by changing the system structure to a more expandable system structure using the channel control unit 300 and the disk control unit 400.

This processing is performed by the processor 811 of the storage control unit 800 or the channel control unit 300 in accordance with instructions from the management terminal 160.

At first, the processor 811 applies locks to the volume management table 835 of the local cache 830 and the volume management table 605 of the global cache 600 (S16000 and S16001). Then, the contents of the "DA No" column, "volume No" column, and "drive No" column of the volume management table 835 of the local cache 830 are changed from information relating to the storage volumes connected to the storage control unit 800 to information relating to the storage volumes connected to the disk control unit 400 (S16002). Further, the contents of the "DA No" column, "volume No" column, and "drive No" column of the volume management table 605 of the global cache 600 are changed from information relating to the storage volumes connected to the storage control unit 800 to information relating to the storage volumes connected to the disk control unit 400 (S16003). After that, the locks to the volume management table 835 of the local cache 830 and the volume management table 605 of the global cache 600 are released (S16004 and S16005).

Thus, the I/O control to the data I/O requests from the host computer 200 can be performed on the storage volumes connected to the disk control unit 400, rather than the storage volumes connected to the storage control unit 800.

As described above, according to the disk control device 110 in relation to the embodiment, all or any of the storage control unit 800, the channel control unit 300, the disk control unit 400, and the global cache 600 can be mounted in the disk control device 110, so that a flexible storage system 100 can be configured according to the needs of customers. It is possible because all types of units are compatible in size, connector position, connector pin arrangement, etc. Further, the volume management table 835 is provided so that each unit can perform data I/O control to the data I/O requests from the host computer 200 even in the disk control device 110 with different types of units mixed and mounted in it.

Furthermore, in the disk control device 110 according to the embodiment, the cache area management table 833 is provided, thereby improving the performance of the storage system 100. In other words, changes to the contents of the cache area management table 833 makes it possible to secure a cache area suitable for the characteristics of each data I/O request received from the host computer 200. For example, if many of data I/O requests received from the host computer 200 are directed to the storage volumes connected to the storage control unit 800, increased allocation to the self-directed SAVOL area 836A can increase the cache hit rate to the data I/O requests from the host computer 200, thus improving the performance of the storage system 100.

Furthermore, in the disk control device 110 according to the embodiment, the volume management table 605 is also provided in the global cache 600. Here, for example, suppose that a storage control unit 800 has received a data I/O request from the host computer 200. Suppose further that the storage control unit 800 consulted its own local cache 830 but was not be able to identify a storage volume to which the data I/O request is directed. In such a case, the storage control unit 800 can consult the volume management table 605 of the global cache 600 to identify a unit to perform I/O control to the storage volume concerned.

Further, when a storage control unit 800 performs data I/O control to storage volumes connected to another storage control unit 800, the data I/O requests can be exchanged between the storage control units 800 through their communication buffers 837, so that each storage control unit 800 can perform data I/O control to storage volumes connected to another storage control unit 800 independently of processing by another storage control unit 800.

Furthermore, data stored in the storage volumes connected to the storage control unit 800 are duplicated and written into the storage volumes connected to the disk control unit 400, so that data I/O control to the next and later data I/O requests from the host computer 200 can be performed on the storage volumes connected to the disk control units 400, thereby improving flexibility in changing the structure of the storage system 100. For example, a customer who started the operation of the storage system 100 with the initial controller 111 at the time of initial introduction can scale up the storage system 100 by changing the system structure to a more expandable system structure using the channel control unit 300 and the disk control unit 400.

Although the embodiment was described above, it should be understood that the embodiment is just to promote a better understanding of the present invention, not to limit the scope of the present invention. Changes and modifications could be made to the above-described embodiment without departing the scope of the present invention. The present invention could also include alternatives to the above-described embodiment.

What is claimed is:

1. A storage device control apparatus comprising:

a plurality of channel control units, each with a host interface controller formed therein for receiving data input/output (I/O) requests;

a plurality of disk control units, each with a disk interface controller formed therein for performing I/O control of the data to storage volumes storing data in response to the data I/O requests;

a plurality of cache memory units, each with a memory formed therein for temporarily storing data being transferred between the channel control units and the disk control units;

a plurality of storage control units, each with a host interface controller a disk interface controller, and a memory formed therein; and an internal connection part which allows said channel control units, said disk control units, said cache memory units, and said storage control units to each be independently connected or disconnected to said storage device control apparatus in a communicable manner.

2. A storage device control apparatus according to claim 1, wherein information for specifying the storage volumes to which one storage control unit performs I/O control is stored in the memory of said storage control unit, and at least either of information for specifying the storage volumes to which said disk control unit performs I/O control and information for specifying the storage volumes to which another storage control unit performs I/O control is stored in the memory of said storage control unit.

3. A storage device control apparatus according to claim 1, wherein the memory of each storage control units includes:

a first storage area for storing the-data to be stored in storage volumes to which said storage control unit performs I/O control, and a second storage area for storing the data to be stored in the storage volumes to which said disk control unit performs I/O control, wherein information for specifying the first and second storage areas are stored in the memory of said storage control unit.

4. A storage device control apparatus according to claim 1, wherein each storage control unit includes a communication buffer for storing data exchanged with another storage control unit.

5. A storage device control apparatus according to claim 1, further comprising:

a mounting part which removably mounts each of said channel control units, said disk control units, said cache memory units, and said storage control units in said storage device control section in a manner to be independent of one another to permit independent connection or disconnection of each of said units to said internal connection part.

6. A control method for a storage device control apparatus including: a plurality of channel control units, each with a host interface controller formed therein for receiving data input/output (I/O requests, a plurality of disk control units, each with a disk interface controller formed therein for performing I/O control of the data to storage volumes storing data in response to the data I/O requests, a plurality of cache memory units, each with a memory formed therein for temporarily storing the data being transferred between the channel control units and the disk control units, a plurality of storage control units, each with a host interface controller a disk interface controller, and a memory formed therein and an internal connection part for connecting the channel control units, the disk control units, the cache memory units, and the storage control units in a communicable manner, wherein a plurality of the storage control units each holds in the memory therein at least information for identifying a unit to perform I/O control to a storage volume to which a data I/O request said control method comprising the steps of:

receiving the data I/O request at one of said storage control unit;

referring to the information by the storage control unit to identify a unit to perform I/O control to a storage volume to which the data I/O request is directed; and performing the I/O control by the storage control unit when the unit to perform the I/O control is the one storage control unit, or letting another storage control unit perform the I/O control when the unit to perform the I/O control is not the one storage control unit.

wherein said internal connection part allows the channel control units, the disk control units, the cache memory units, and the storage control units to each be independently connected or disconnected to said storage device control apparatus.

7. A control method according to claim 6, wherein when the data I/O request received by one of the storage control units is a data read request, and the unit to perform the I/O control is not the one storage control unit, said step of carrying out the I/O control by said another storage control unit comprises the steps of:

sending the read request to said another storage control unit by the storage control unit;

performing the I/O control in response to the read request by said another storage control unit;

receiving data from said another storage control unit by the storage control unit; and sending the received data to an information processing apparatus by the storage control unit.

8. A control method according to claim 7, wherein the storage control unit includes a communication buffer for storing data exchanged with said another storage control unit, said step of sending the read request to said another storage control unit by the one storage control unit comprises the steps of:

writing the read request into a communication buffer provided in said another storage control unit by the storage control unit, and reading the read request from the communication buffer of said another storage control unit by said another storage control unit, and said step of receiving the data from said another storage control unit by the one storage control unit includes is the step of:

reading the data written by said another storage control unit in the communication buffer provided in the one storage control unit by the one storage control unit.

9. A control method according to claim 6, wherein when the data I/O request received by one of the storage control units is a data write request, and the unit to perform the I/O control is not the one storage control unit, said step of performing the I/O control by said another storage control unit comprises the steps of:

sending the write request and write data to said another storage control unit by the one storage control unit; and performing the I/O control of the write data in response to the write request by said another storage control unit.

10. A control method according to claim 9, wherein the storage control unit includes a communication buffer for storing data exchanged with said another storage control unit, and said step of sending the write request and the write data to said another storage control unit by the one storage control unit comprises the steps of:

writing the write request and the write data into a communication buffer provided in said another storage control unit by the one storage control unit, and reading the write request and the write data from the communication buffer of said another storage control unit by said another storage control unit.

11. A control method according to claim 9, further comprising the steps of:

receiving from said another storage control unit data indicating that the I/O control of the write data has been completed by the one storage control unit; and sending the information processing apparatus data indicating that the I/O control has been completed, by the one storage control unit.

12. A control method according to claim 11, wherein the storage control unit includes a communication buffer for storing data exchanged with said another storage control unit, and said step of receiving data indicating that the I/O control of the write data has been completed from said another storage control unit by the one storage control unit, includes is the step of:

reading the data written by said another storage control unit in the communication buffer provided in the one storage control unit by the one storage control unit.

13. A control method according to claim 6, wherein said storage device control apparatus further includes:

a mounting part which removably mounts each of said channel control units, said disk control units, said cache memory units, and said storage control units in said storage device control section in a manner to be independent of one another to permit independent connection or disconnection of each of said units to said internal connection part.

14. A control method according to claim 13, wherein a plurality of the storage control units and at least one disk control unit are mounted in the mounting part, said method further comprising the steps of:

receiving the data I/O request by one of the storage control units;

referring to the information by the one storage control unit to identify a unit to perform the I/O control to a storage volume to which the data I/O request is directed; and performing the I/O control by the one storage control unit when the unit to perform the I/O control is the one storage control unit, performing the I/O control by the at least one disk control unit when the unit to perform the I/O control is the at least one disk unit, or performing the I/O control by another storage control unit when the unit to perform the I/O control is said another storage control unit.

15. A control method according to claim 13, wherein when at least one storage control unit, one disk control unit, and one cache memory unit are mounted in the mounting part, the memory of the at least one storage control unit includes:

a first storage area for storing the-data to be stored in storage volumes to which the at least one storage control unit performs I/O control, and a second storage area for storing the data to be stored in the storage volumes to which the one disk control unit performs I/O control, wherein said control method further comprises the steps of:

receiving a data I/O request by the at least one storage control unit;

referring to information by the at least one storage control unit to identify a unit to perform the I/O control to the storage volume to which the data I/O request is directed;

performing the I/O control to the first storage area by the at least one storage control unit when the unit to perform the I/O control is the at least one storage control unit;

performing the I/O control to the one cache memory unit by the at least one storage control unit when the data is not stored in the first storage area; and performing the I/O control to the storage volume by the at least one storage control unit when the data is not stored in the one cache memory unit.

16. A control method according to claim 13, wherein when at least one storage control unit, one disk control unit, and one cache memory unit are mounted in the mounting part, the memory of the storage control unit includes:

a first storage area for storing the-data to be stored in storage volumes to which the at least one storage control unit performs I/O control, and a second storage area for storing the data to be stored in the storage volumes to which the one disk control unit performs I/O control, wherein said control method further comprises the steps of:

receiving a data I/O request by the at least one storage control unit;

referring to information by the at least one storage control unit to identify a unit to perform the I/O control to a storage volume to which the data I/O request is directed;

performing the I/O control to the second storage area by the at least one storage control unit when the unit to perform the I/O control is the one disk control unit;

performing the I/O control to the one cache memory unit by the at least one storage control unit when the data is not stored in the second storage area; and performing the I/O control to the at least one storage volume by the at least one storage control unit when the data is not stored in the one cache memory unit.

17. A control method according to claim 13, wherein when a cache memory unit is mounted in the mounting part, said control method further comprising the step of:

duplicating information stored in the memory of each of the storage control units by each of the storage control units, for identifying a unit to perform the I/O control to a storage volume to which the data I/O request is directed, and write the duplicated information into the cache memory unit, wherein:

said step of referring to the information by the storage control unit to identify a unit to perform the I/O control to a storage volume to which the I/O request is directed comprises:

a step of referring to the-information in the cache memory unit by the storage control unit to identify the unit when the storage control unit cannot identify the unit merely by consulting the information stored in the memory of the storage control unit.

18. A control method according to claim 13, wherein when a disk control unit is mounted in the mounting part, said control method further comprising the steps of:

duplicating data stored in a storage volume to which a storage control unit performs I/O control by one of the storage control units, and write the duplicated data into the storage volume to which the disk control unit performs I/O control; and changing information, stored in the respective memories of the storage control unit and another storage control unit for identifying a unit to perform the I/O control, from the storage control unit to the disk control unit.

19. A control method according to claim 13, wherein at least one storage control unit and one disk control unit are mounted in the mounting part, said method further comprising the steps of:

receiving the data I/O request by the at least one storage control unit;

referring to information by the at least one storage control unit to identify a unit to perform the I/O control to a storage volume to which the I/O request is directed; and performing the I/O control by the at least one storage control unit when the unit to perform the I/O control is the at least one storage control unit, or performing the I/O control by a disk control unit when the unit to perform the I/O control is not the at least one storage control unit.

20. A control method according to claim 19, wherein when the data I/O request received by the at least one storage control unit is a data read request, and the unit to perform the I/O control is not the at least one storage control unit, said step of performing the I/O control by the disk control unit comprises the steps of:

sending the read request to the disk control unit by the at least one storage control unit;

performing the I/O control in response to the read request by the disk control unit;

receiving data from the disk control unit by the at least one storage control unit; and sending the received data to an information processing apparatus by the at least one storage control unit.

21. A control method according to claim 19, wherein when the data I/O request received by the at least one storage control unit is a data write request, and the unit to perform the I/O control is not the at least one storage control unit, said step of performing the I/O control by the disk control unit comprises the steps of:

sending the write request and write data to the disk control unit by the at least one storage control unit; and performing the I/O control of the write data in response to the write request by the at least one storage control unit.

22. A control method according to claim 19, wherein the memory of the at least one storage control unit includes:

a first storage area for storing the data to be stored in storage volumes to which the at least one storage control unit performs I/O control, and a second storage area for storing the data to be stored in the storage volumes to which the disk control unit performs I/O control, wherein:

when the unit to perform the I/O control is the at least one storage control unit, the at least one storage control unit performs the I/O control of the data to the first storage area, or when the unit to perform the I/O control is not the at least one storage control unit, the disk control unit performs the I/O control of the data to the second storage area.

* * * * *